Figure 1:
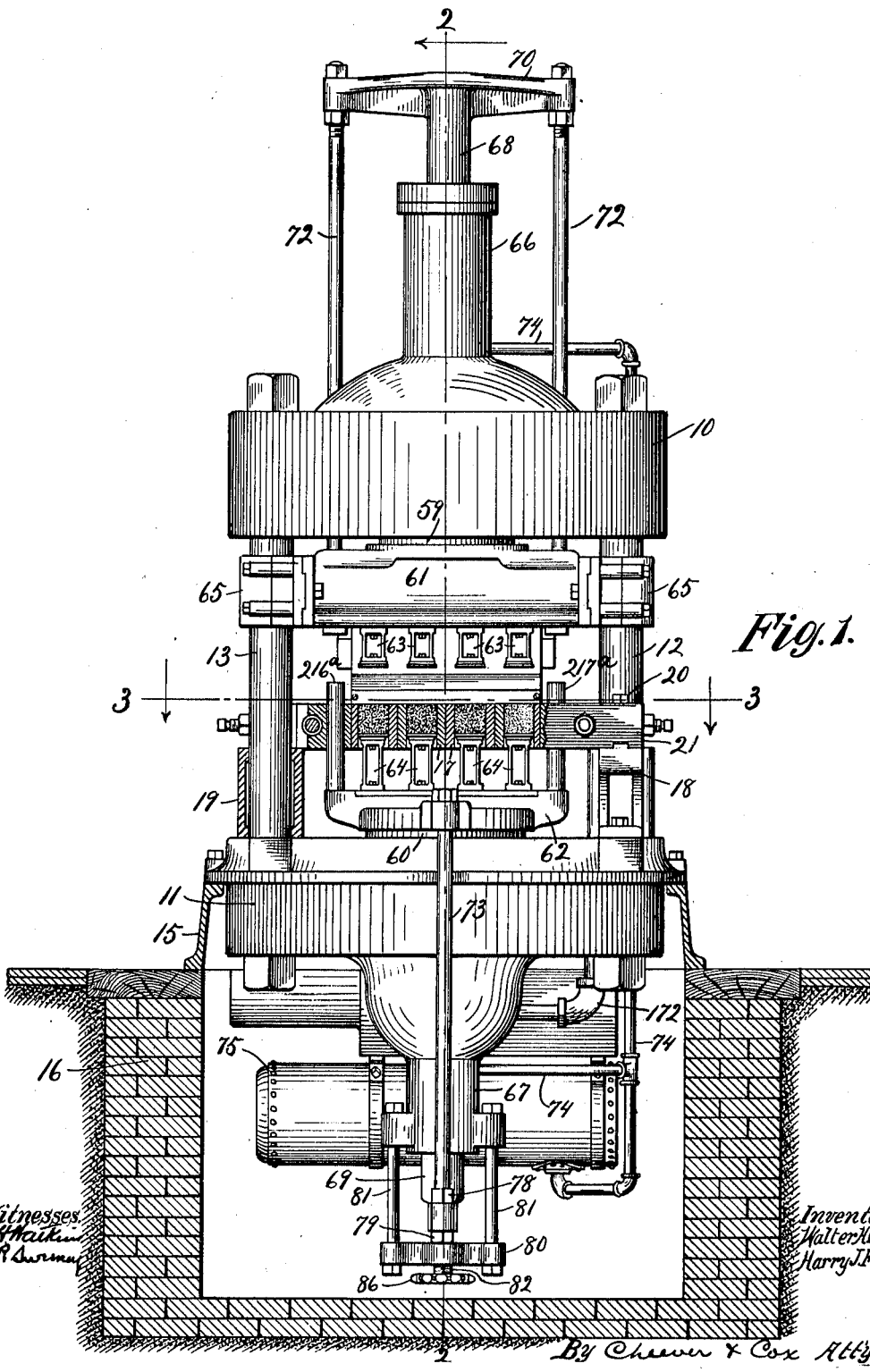

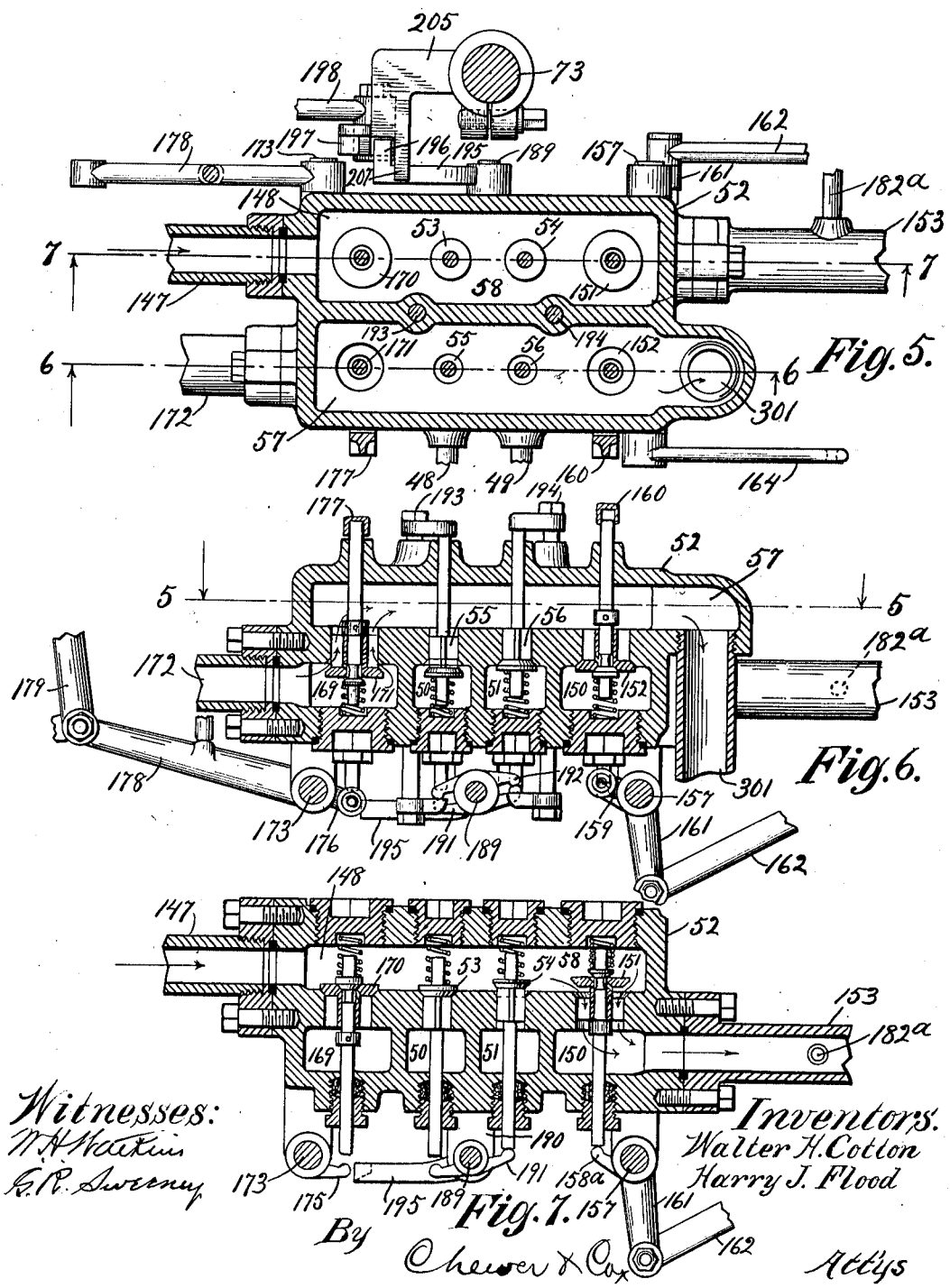

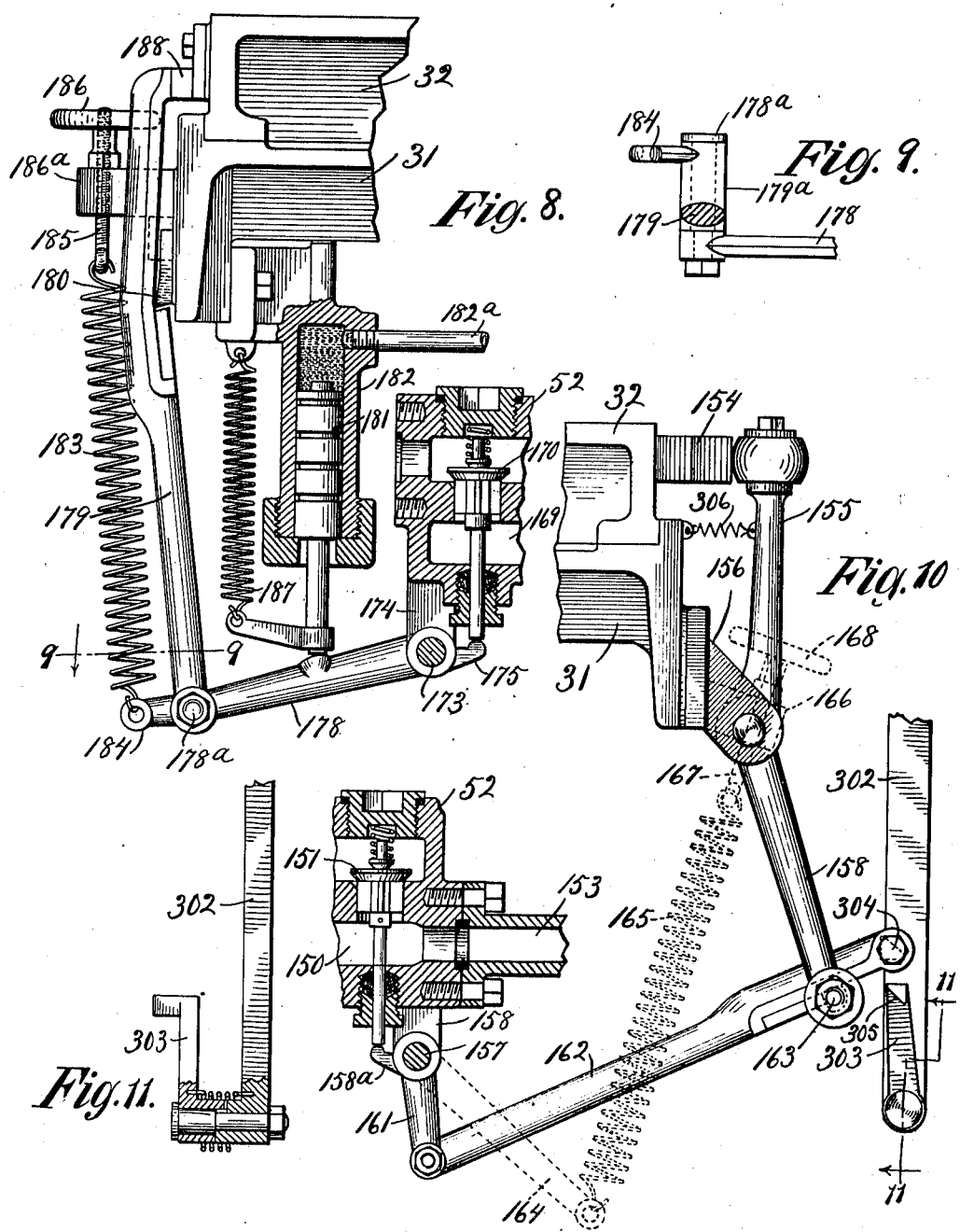

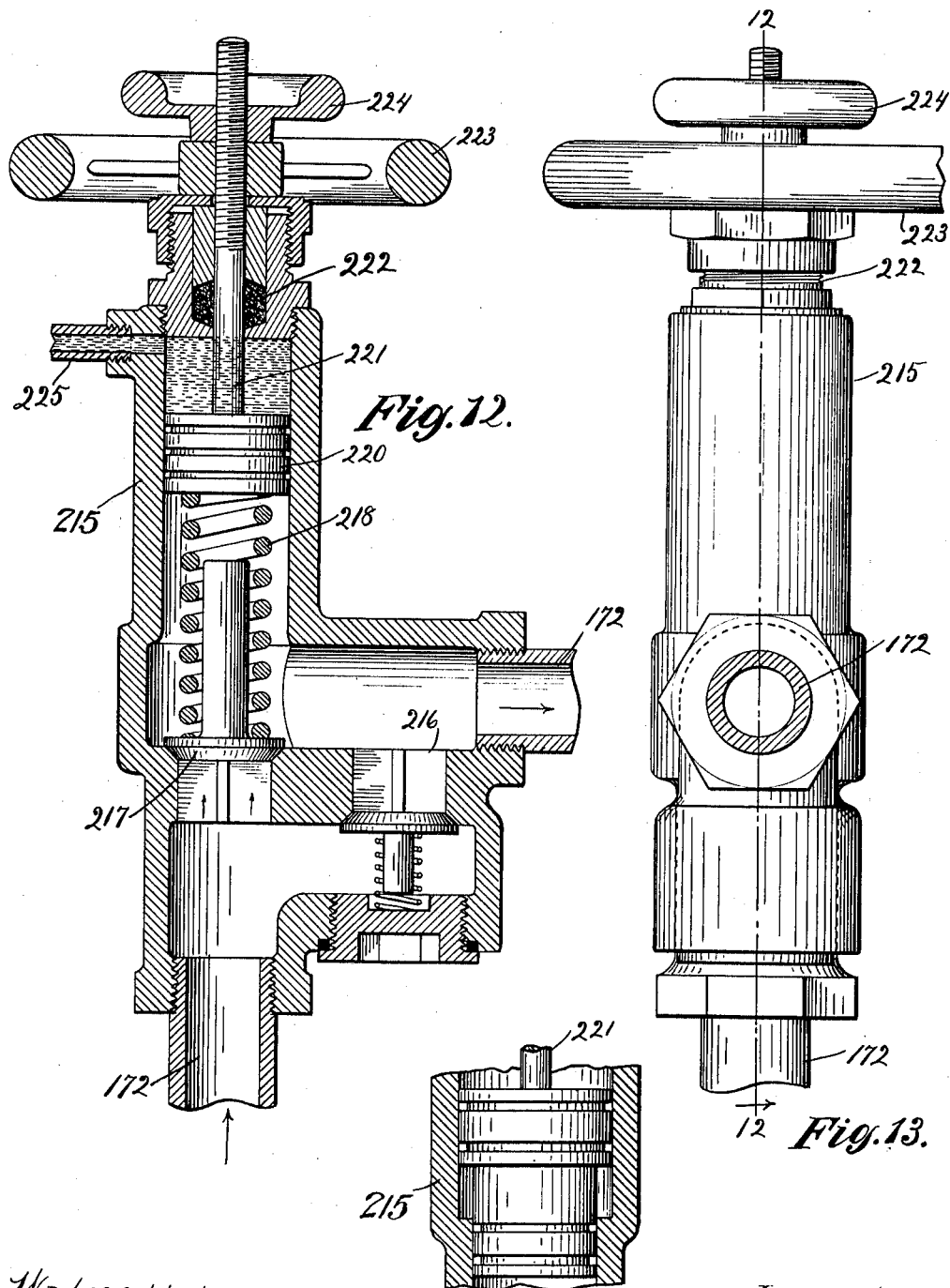

W. H. COTTON & H. J. FLOOD.
HYDRAULIC PRESS.
APPLICATION FILED AUG. 25, 1908.

1,003,987.

Patented Sept. 26, 1911.
15 SHEETS—SHEET 8.

Witnesses:
W. H. Watkins
G. R. Swrney

Inventors:
Walter H. Cotton
Harry J. Flood
By Cheever & Cox Attys.

W. H. COTTON & H. J. FLOOD.
HYDRAULIC PRESS.
APPLICATION FILED AUG. 25, 1908.

1,003,987.

Patented Sept. 26, 1911.
15 SHEETS—SHEET 9.

Witnesses:
N. A. Watkins
G. R. Sweeney

Inventors:
Walter H. Cotton
Harry J. Flood
By Cheever & Cox
Attys.

W. H. COTTON & H. J. FLOOD.
HYDRAULIC PRESS.
APPLICATION FILED AUG. 25, 1908.

1,003,987.

Patented Sept. 26, 1911.
15 SHEETS—SHEET 11.

Witnesses:
W. H. Watkins
G. R. Sweeney

Inventors:
Walter H. Cotton
Harry J. Flood
By Cheever & Cox Attys.

W. H. COTTON & H. J. FLOOD.
HYDRAULIC PRESS.
APPLICATION FILED AUG. 25, 1908.

1,003,987.

Patented Sept. 26, 1911.
15 SHEETS—SHEET 12.

Witnesses:
M. H. Watkins
E. R. Sweeney

Inventors:
Walter H. Cotton
Harry J. Flood
By Cheever & Cox Attys.

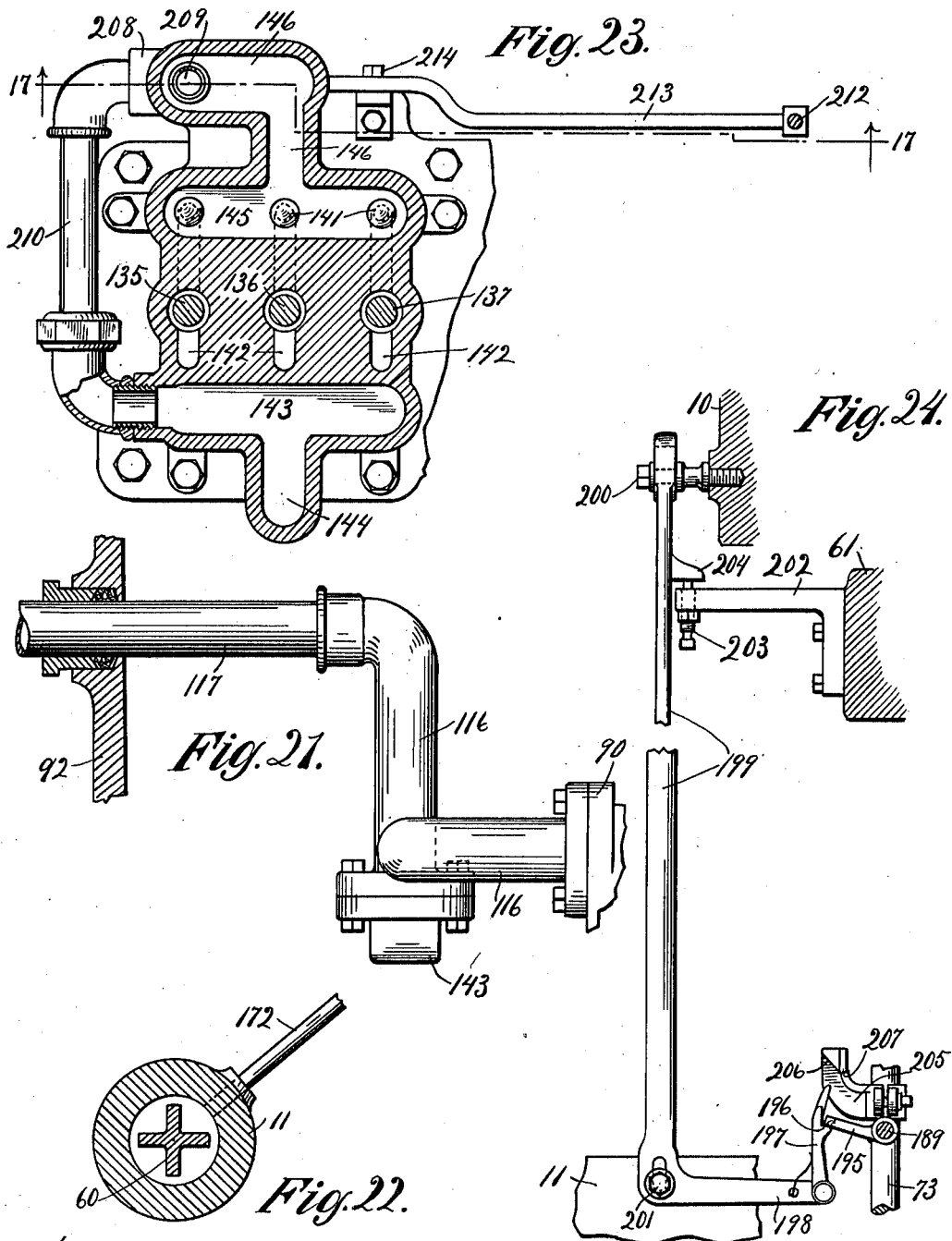

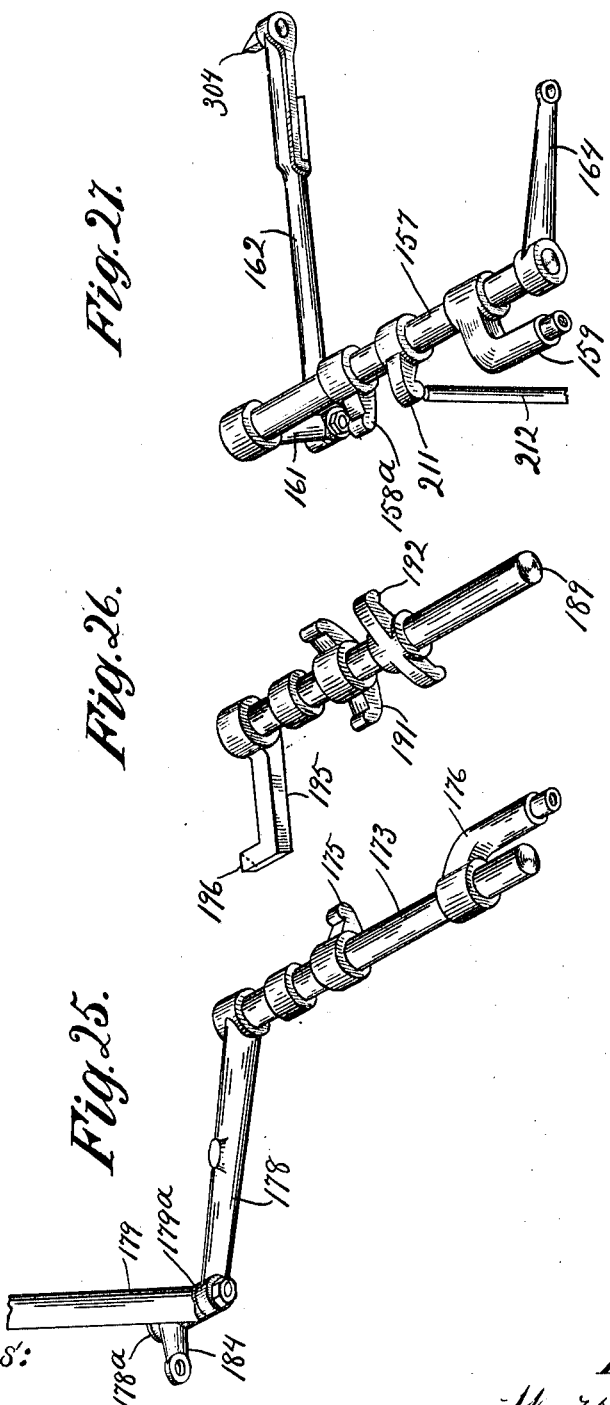

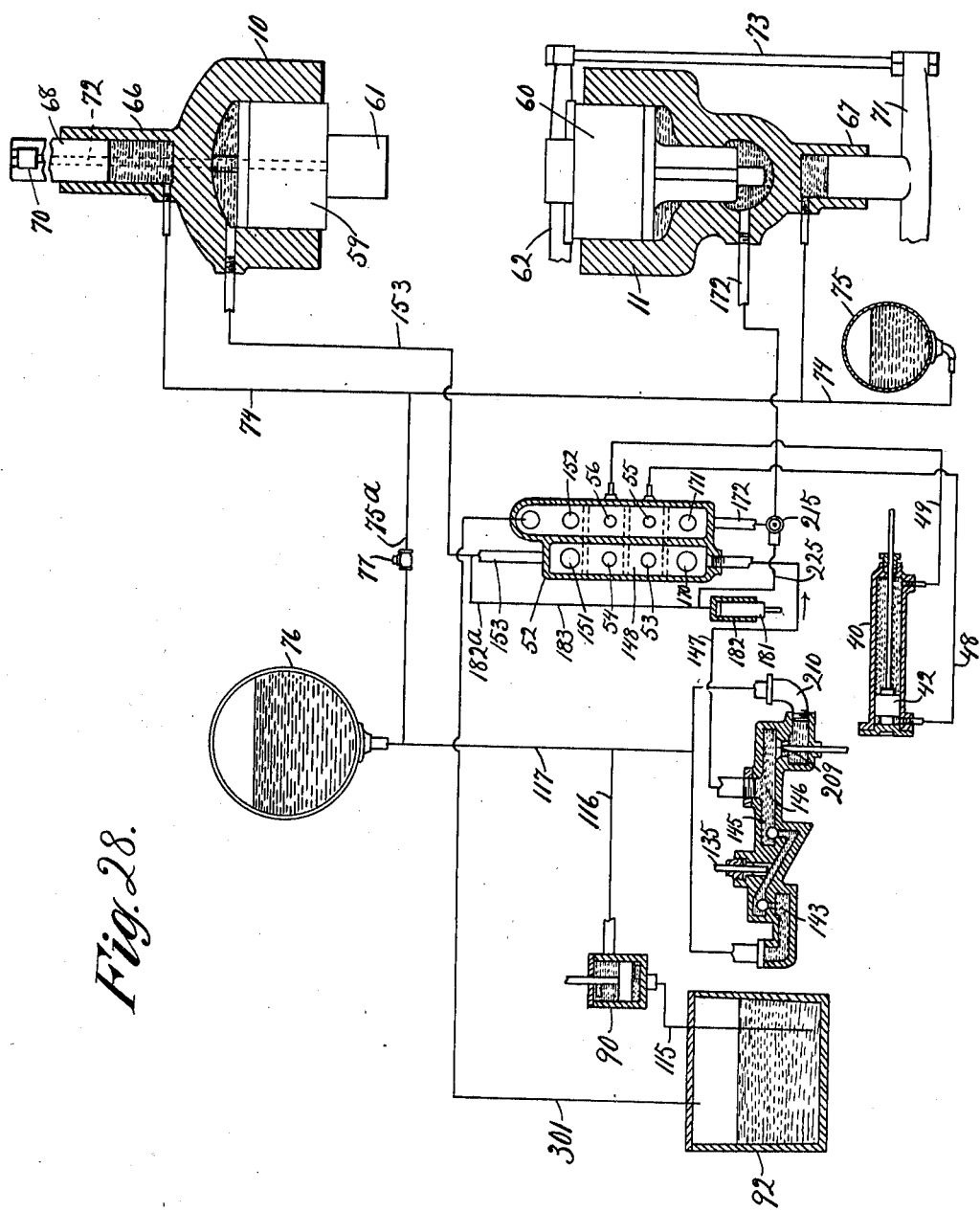

UNITED STATES PATENT OFFICE.

WALTER H. COTTON AND HARRY J. FLOOD, OF CHICAGO, ILLINOIS, ASSIGNORS TO CHISHOLM, BOYD & WHITE COMPANY, OF CHICAGO, ILLINOIS, A CORPORATION OF ILLINOIS.

HYDRAULIC PRESS.

1,003,987.  Specification of Letters Patent.  Patented Sept. 26, 1911.

Application filed August 25, 1908. Serial No. 450,239.

*To all whom it may concern:*

Be it known that we, WALTER H. COTTON and HARRY J. FLOOD, citizens of the United States, residing in the city of Chicago, county of Cook, State of Illinois, have invented certain new and useful Improvements in Hydraulic Presses, of which the following is a description.

This invention relates to machines operated by fluid pressure, and while the principles of the invention are applicable to a wide variety of uses, they are particularly applicable to machines for molding material into form. To impart the invention we have chosen to illustrate it as embodied in a machine for making pressed brick.

To facilitate description it may be stated briefly that the machine illustrated consists in general of a frame having a set of molds in each of which an upper and a lower plunger is vertically movable. These plungers are moved toward each other by means of an upper and a lower ram, respectively. They are retracted by means of auxiliary retracting pistons operating in valveless cylinders which communicate with an air-containing closed tank. When the rams advance they cause compression of the air in said tank, and as soon as said rams are sufficiently relieved of pressure, the compressed air in said tank, operating upon said retracting pistons causes the return of the rams to initial position. The machine operates in connection with an accumulator, a low pressure pump for supplying operating liquid to the ram cylinders, either direct or through the accumulator, and a high pressure pump for intensifying the pressure of the rams for a limited period during the pressing action. In the design shown, the pumps are mounted within the "pump box" or reservoir which supplies the operating liquid and to which said liquid is returned upon exhaust from the ram cylinders. The clay is fed into the mold and the previously finished brick delivered by means of a horizontally reciprocating charger. The machine also includes valves and valve gears, the latter operating automatically. In the form illustrated, most of the valves are contained within a single box or casing.

In operation, starting with the upper ram and plungers up, the lower ram and plungers down, the molds filled and the charger back in retracted position, the parts move as follows: The upper ram and plungers descend until the plungers have entered part way into the mold. When the pressure on the clay has reached a predetermined intensity the lower plungers automatically rise toward them. At this period the high pressure pump is active and the pressure upon the clay in the molds is very great. The plungers mutually approach until they engage certain distance blocks which determine the thickness of the brick. Both sets of plungers then rise in unison, the rise being due to the fact that the lower ram has a greater area than the upper one. As the upper plungers are about to leave the mold, a valve is tripped and the high pressure pump is rendered ineffective, the remainder of the rise of the lower plunger occurring under accumulator pressure. A high pressure pump determines the rate of upward movement as the plungers are rising in unison. About the time the upper plungers are ready to leave the mold the upper main cylinder is automatically opened to exhaust, and the upper ram and plungers rise rapidly under the influence of the upper retracting piston. The lower plungers come flush with the top of the mold, and the charger, which has in the meantime started forward, pushes the finished brick onto the delivery apron. While the charger is thus in forward position the lower plungers suddenly drop under the influence of the lower retracting piston thus causing the clay in said charger (which is open top and bottom and slides on the flat table of the machine) to drop into and fill the mold. The charger then returns to normal retracted position and all is ready for another descent of the upper plungers, and a repetition of the cycle.

Bearing the above outline in mind, the general object of the invention is to produce simple, convenient and efficient means for operating the plungers and charger automatically and in proper relation.

As contributary to the general object it is an object of the invention: First, to provide means for rapidly retracting the rams. Second, to provide means for limiting the mutual approach of the rams no matter how great the pressure under which they are acting. Third, to provide means for moving the substance in the mold while under maximum pressure. Fourth, to provide means for regulating the relative intensities of pressure upon the upper and lower rams. Fifth, to provide means whereby one ram will be started upon its travel only when the pressure upon the other ram has reached a predetermined intensity. Sixth, to provide means for automatically increasing the speed of the upper ram as its plungers are about to leave the mold. Seventh, to provide means for operating the charger in timed relation with the rams. Eighth; to provide means for intensifying the pressure upon the rams during a predetermined period of their cycles of operation. Ninth, to provide means for automatically rendering the pumps temporarily ineffective. Tenth, to provide safety devices to prevent excessive pressures. Eleventh, to provide certain details of construction whereby the parts will be operated rapidly, certainly and efficiently.

Figure 2:
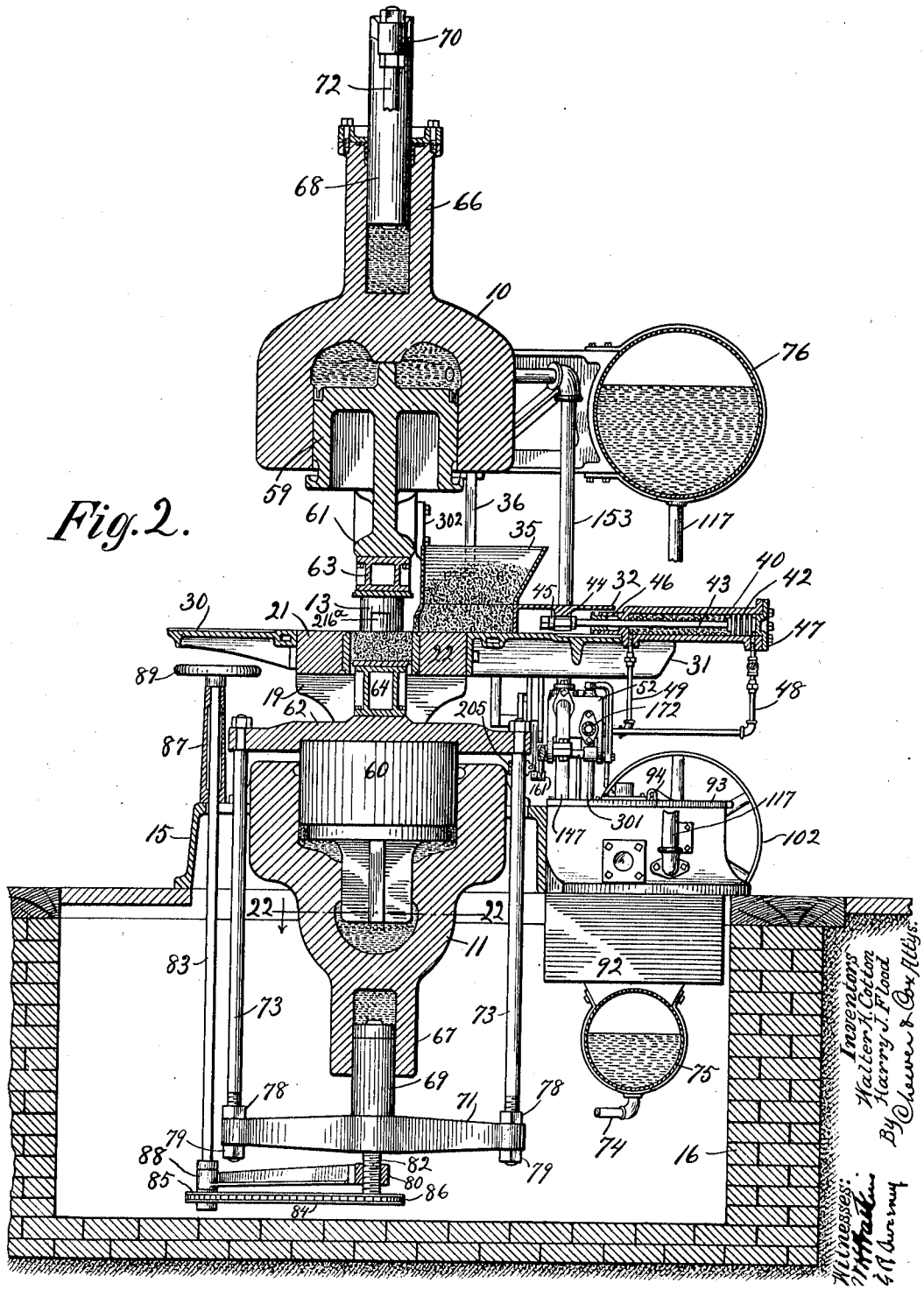
Figure 3:
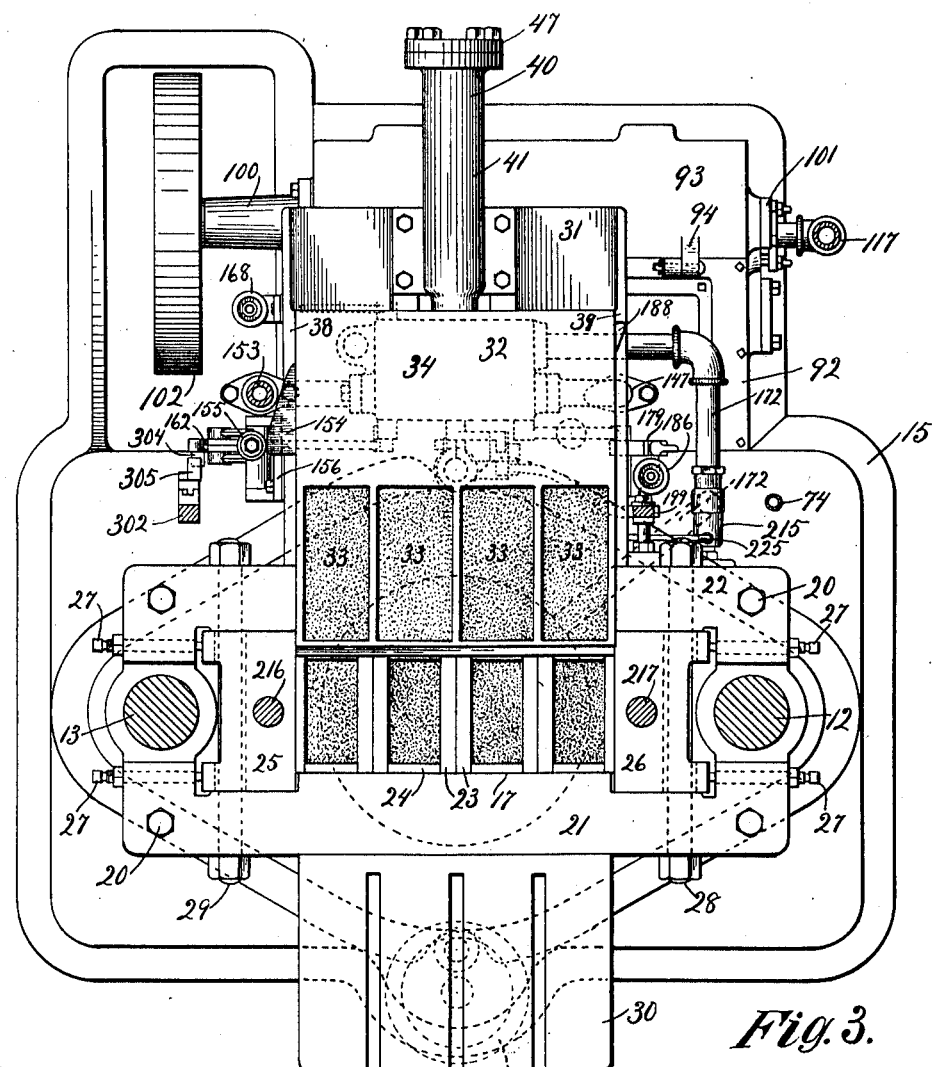
Figure 4:
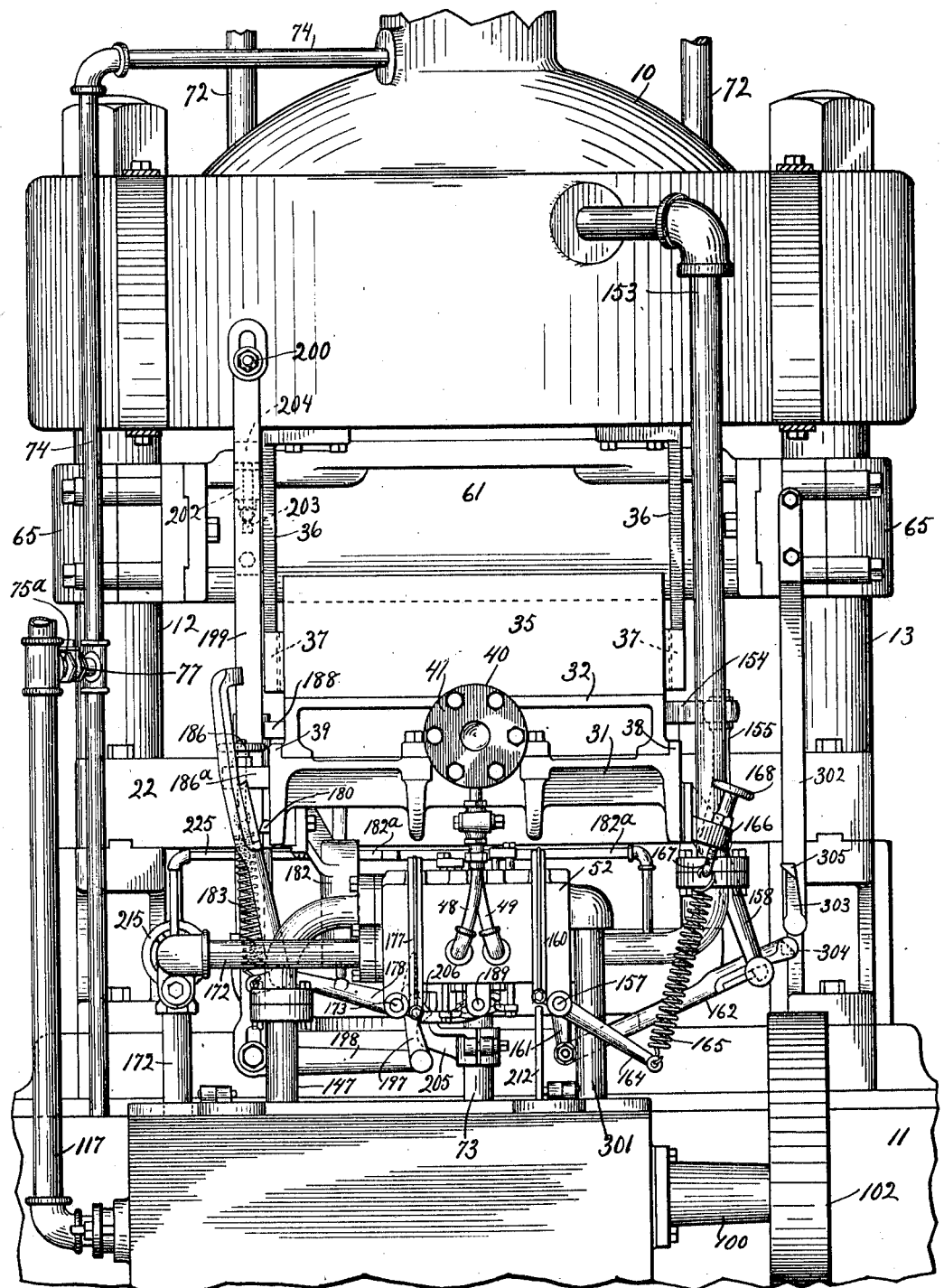
Figure 15:
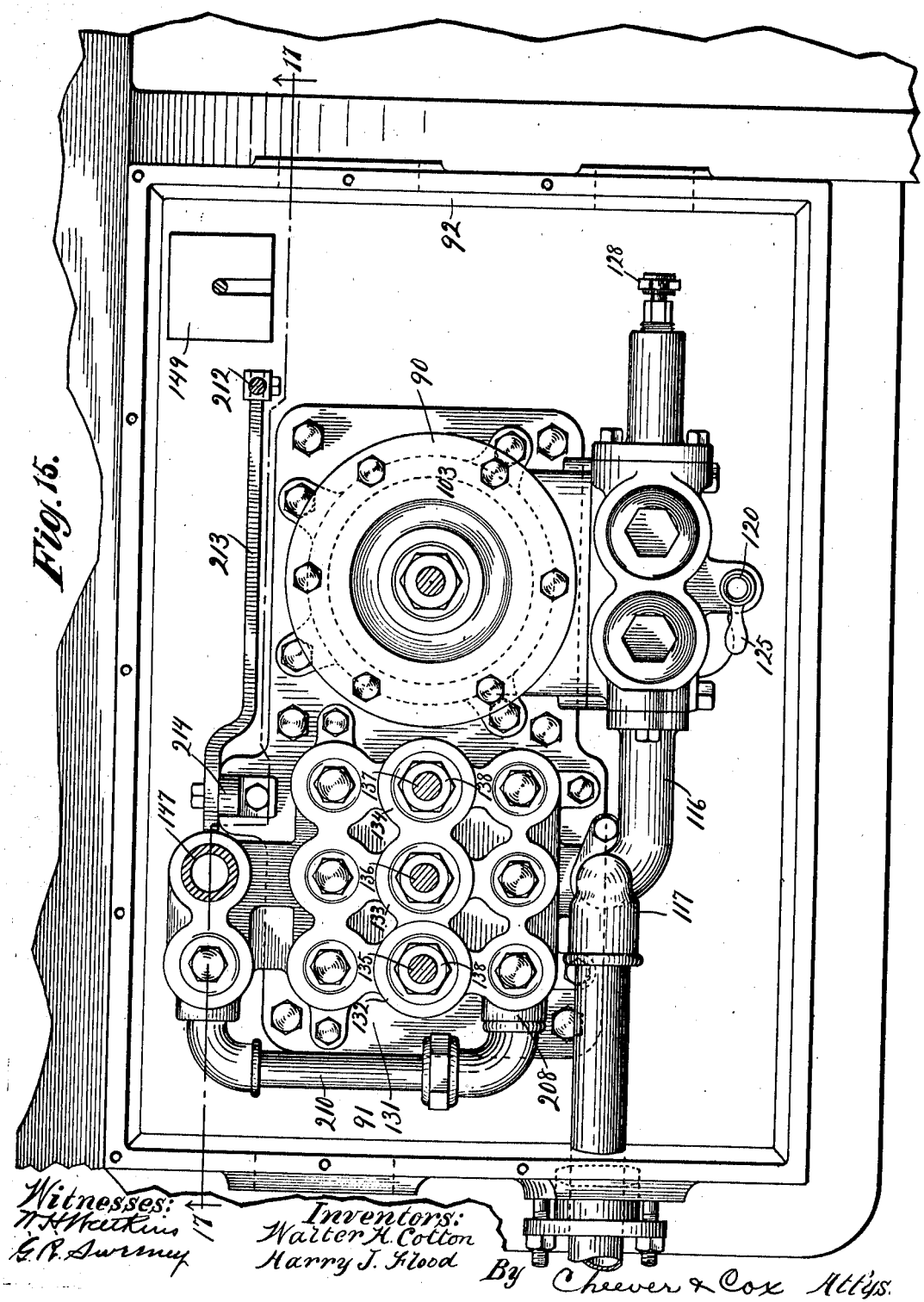
Figure 16:
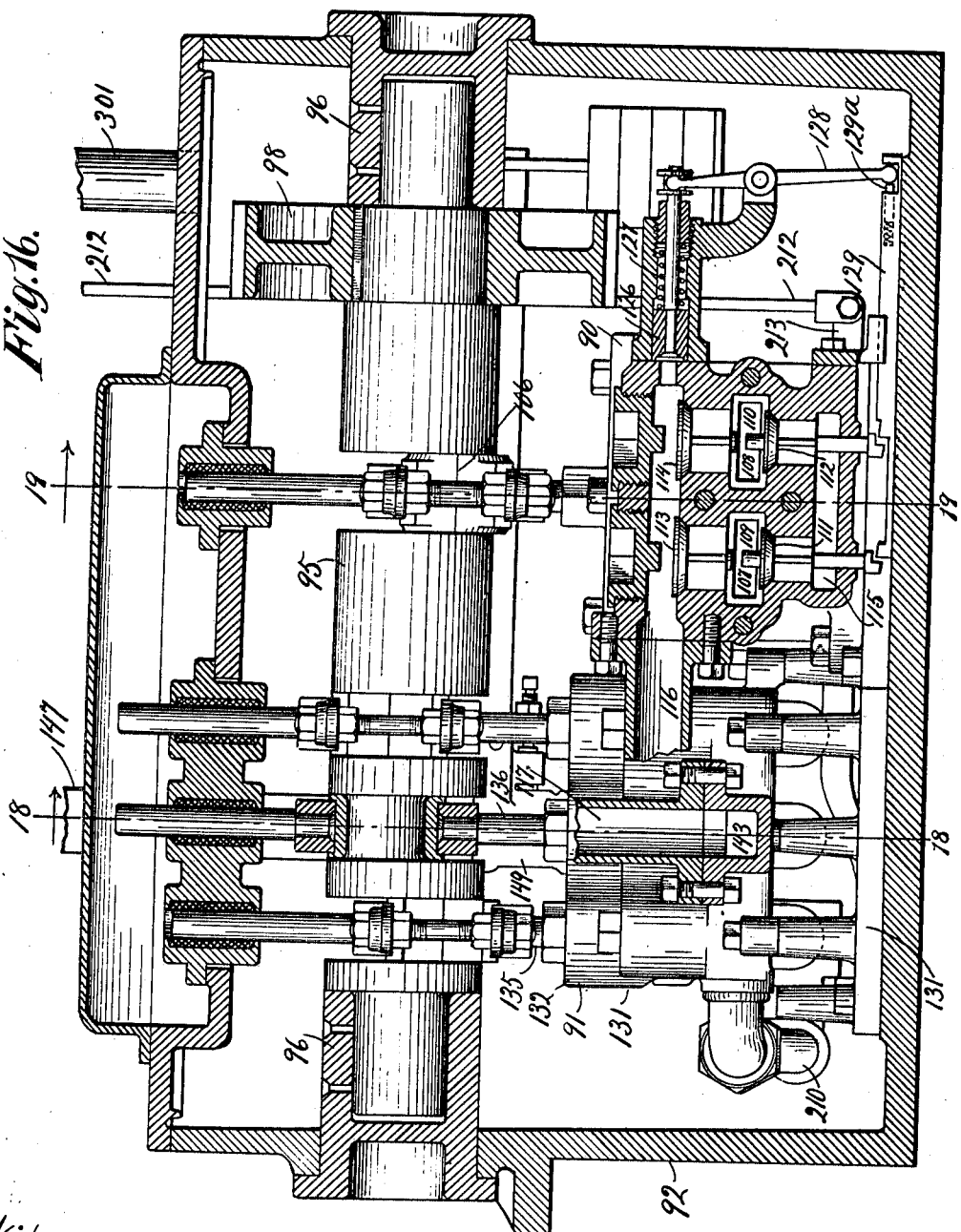
Figure 17:
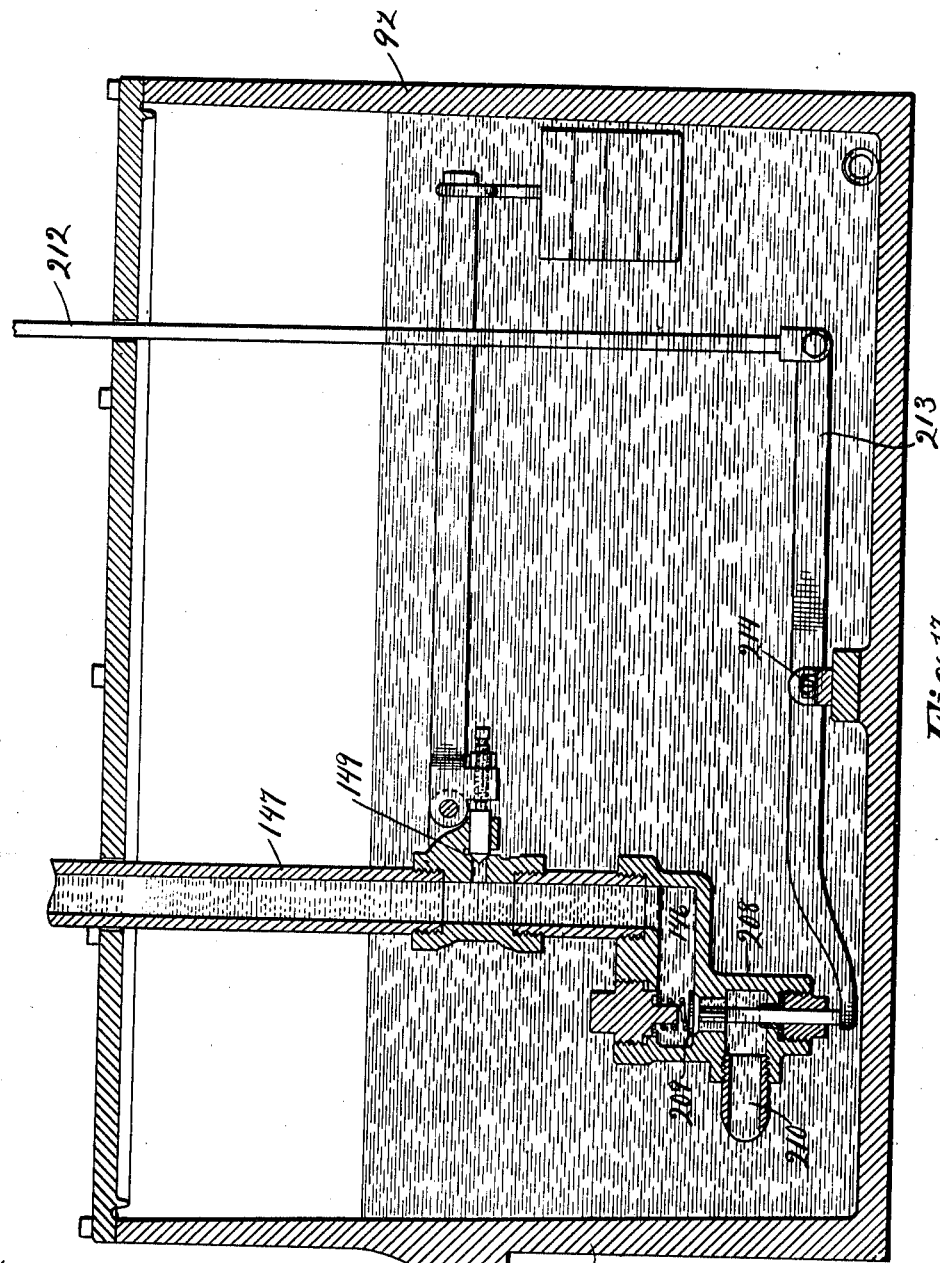
Figure 18:
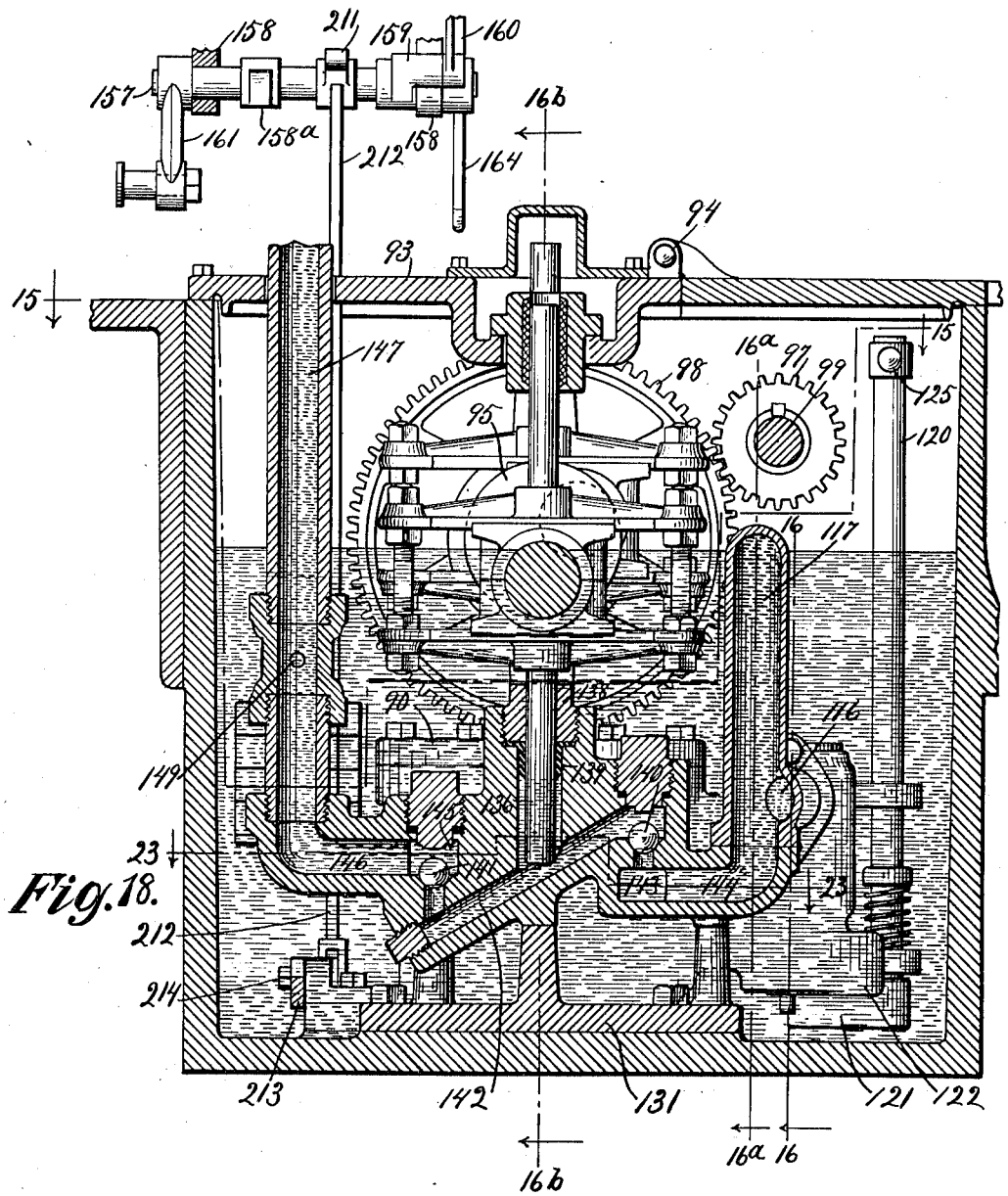
Figures 19, 20:
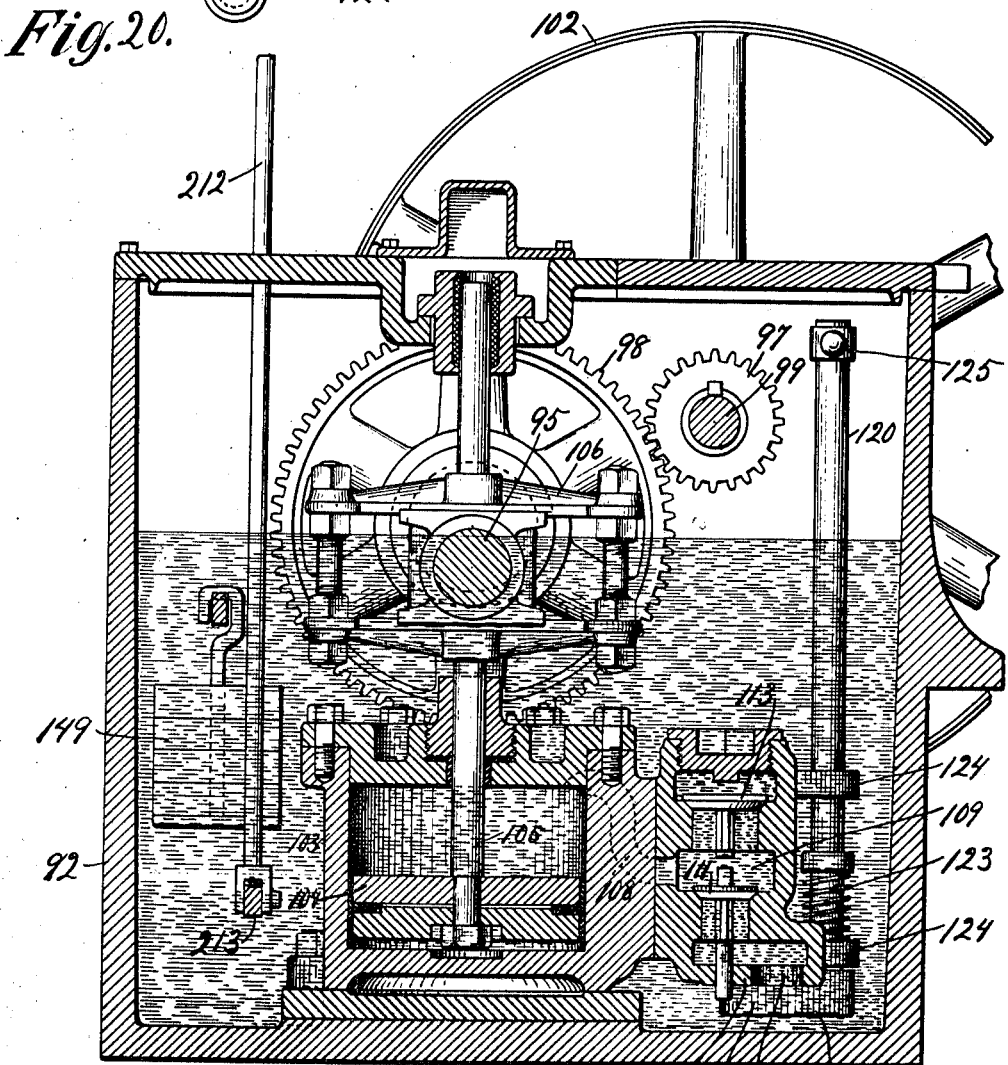

Referring to the drawings which show the machine selected to illustrate the invention: Figure 1 is a front elevation showing certain parts in cross section. Fig. 2 is a sectional elevation, substantially on line 2—2 of Fig. 1; the pumping mechanism and valve casing being shown in full lines. Fig. 3 is a plan section, substantially on line 3—3 of Fig. 1. Fig. 4 is a rear view showing particularly the various valve gears, the accumulator being removed to better reveal the parts. Fig. 5 is a sectional plan view of the valve casing on line 5—5 of Fig. 6. Fig. 6 is a sectional elevation on line 6—6 of Fig. 5. Fig. 7 is a sectional elevation on line 7—7 of Fig. 5. Fig. 8 is a rear elevation, partly in section, illustrating the lower main cylinder valve gear. Fig. 9 is a detail plan view on line 9—9 of Fig. 8. Fig. 10 is a rear elevation, partly in section illustrating the upper main cylinder valve gear. Fig. 11 is a detail of the upper main cylinder valve gear on line 11—11 of Fig. 10. Fig. 12 is a sectional elevation of the choking valve on line 12—12 of Fig. 13. Fig. 13 is an exterior view of the choking valve. Fig. 14 shows a modification in the form of piston used in the choking valve. Fig. 15 is a plan view of parts of the pumping mechanism. Fig. 16 is an elevation showing parts of the pumping mechanism in section. The section is taken at various points indicated by the lines 16—16, 16ᵃ—16ᵃ, and 16ᵇ—16ᵇ of Fig. 18. Fig. 17 is a sectional elevation on line 17—17 of Figs. 15 and 23. Fig. 18 is a sectional elevation on line 18—18 of Fig. 16. Fig. 19 is a sectional elevation on line 19—19 of Fig. 16. Fig. 20 is a bottom view of the low pressure pump valve casing. Fig. 21 is an elevation of the piping shown in the lower left corner of Fig. 15. Fig. 22 is a plan section through the lower cylinder on line 22—22 of Fig. 2. Fig. 23 is a sectional plan of the high pressure pump and bypass shown in Fig. 15. Fig. 24 is a detail of the mechanism which operates the valves which control the charger. Fig. 25 is a perspective view of the lower main cylinder valve shaft. Fig. 26 is a perspective view of the charger valve shaft. Fig. 27 is a perspective view of the upper main cylinder valve shaft and Fig. 28 is a diagram showing the theory of operation of the machine.

Similar reference characters refer to similar parts throughout the several views.

*The main cylinders.*—In the form of press illustrated, the upper main cylinder 10 and lower main cylinder 11 are rigidly connected together by means of the tension bars 12 and 13 as best shown in Figs. 1, 3 and 4. The machine rests upon a base 15 which is mounted upon a suitable foundation 16.

*The molds and mold table.*—The molds, which in the present case are four in number, are formed within a mold box interposed between the two main cylinders 10 and 11. Said mold box rests upon supports 18 and 19 which are vertically apertured to fit the tension rods 12 and 13 and are held in place by means of bolts 20. This particular form of mold box forms no part of this invention but to facilitate a clear understanding of the entire machine, it may be briefly described as follows, reference being had especially to Figs. 1, 2 and 3: Said mold box consists of front and rear members 21 and 22, grooved on their inner sides and adapted to receive the side and end liners 23 and 24 which are tongued to fit the grooves. A pair of blocks 25 and 26 are adapted to be adjusted laterally by set screws 27 and serve to hold the liners together. The members 21 and 22 are prevented from spreading by bolts 28 and 29. An apron 30, bolted to the front of member 21, serves to receive the brick upon delivery from the mold. A rear apron 31 is secured to the rear member of the mold box and said apron and mold box forms a level table upon which the charger 32 reciprocates.

*The hopper.*—A hopper 35 is so located as to lie above the compartments of the charger when the latter is in retracted position as shown in Figs. 2 and 3. In the preferred form the hopper rests by gravity upon the top of the charger and is prevented from lateral movement by means of lugs 37 which are formed on the side of the charger and are guided by stationary vertical guides 36. With this construction horizontal play of the hopper is prevented but said hopper is free to move in a vertical direction. Prepared clay is supplied to the hopper in any suitable manner usually through spouts leading from the storage bin (not shown).

*The charger.*—The charger 32 above mentioned is of usual construction, having a plurality of compartments 33, one for each of the molds and a flat surface 34, rearward of said compartments. Said flat surface forms a support for the hopper and also constitutes a shut off or bottom to the hopper when the charger is forward. Said charger is guided laterally, by guides 38 and 39, formed on rear apron 31 as best shown in Figs. 3 and 4. It is reciprocated over the mold box by means of the cylinder 40 bolted to the apron 31. Said cylinder is of the double acting type having the usual piston 42 and piston rod 43 connected in the present instance to a lug 44 on the charger by a recessed collar 45 secured to said piston rod 43 as best shown in Fig. 2. Said cylinder is provided with the usual stuffing box 46 and head 47. Liquid is conveyed to and discharged from each end of the cylinder 40 through a pair of pipes 48 and 49 which communicate with the valve chambers 50 and 51 of the box or valve casing 52. Said casing contains an induction valve 53 and a discharge valve 55 for one end of the cylinder, and an induction valve 54 and discharge valve 56 for the other end of the cylinder. The discharge valves 55 and 56 are located within the exhaust chamber 57 while the induction valves 53 and 54 are located within the supply chamber 58 of the valve casing 52 as best shown in Figs. 5, 6 and 7. The operating liquid is supplied to the chamber 58 of said casing through the pipe 147 and is discharged from the exhaust chamber 57 through the pipe 301. These cylinder-controlling valves 53, 54, 55 and 56 are controlled by parts moving in unison with the rams 59 and 60 working in the cylinders 10 and 11 respectively. The mechanism which controls said valves is best indicated in Fig. 24 and will be hereinafter described.

*The rams.*—The main operating pistons 59 and 60 herein referred to as "rams" are arranged in this brick machine to reciprocate vertically within said main cylinders and carry crossheads 61 and 62 respectively to which are bolted the upper and lower plungers 63 and 64 as best shown in Figs. 1 and 2. The lower ram is of greater diameter than the upper one in order that it may have greater force and be able to raise the clay and upper plungers in the mold at a time when the clay is under pressure from said upper plungers. The lower plungers 64 never leave the molds, and serve to guide the lower ram and crosshead. The upper crosshead is guided by boxes 65 adapted to slide upon the upright tension bars 12 and 13.

*The retracting cylinders.*—The raising of the upper ram and lowering of the lower ram to normal position is effected through auxiliary or "retracting" cylinders. Their purpose is to raise the upper crosshead 61 and lower the lower crosshead 62 after the plungers attached to said crossheads have completed the pressing action. The retracting cylinder 66 is located at the top of cylinder 10 and has a piston 68 which carries a crosshead 70 adjustably connected to the upper crosshead 61 by tension rods 72. In a similar manner the retracting cylinder 67 is located at the bottom of cylinder 11 and has a piston 69 which carries a crosshead 71 adjustably connected to the lower crosshead 62 by means of tension rods 73. These retracting cylinders are connected by piping 74 with an auxiliary tank 75 into which fluid is forced through a pipe 75$^a$ (shown at the left of Fig. 4) from the accumulator 76. Pipe 75$^a$ is provided with a check valve 77 as a result of which the minimum pressure in tank 75 is equal to the maximum pressure in the accumulator 76. In case of leakage from tank 75 said check valve permits the passage of liquid to compensate for loss.

The upper portion of tank 75 forms an air cushion for the liquid in the retracting cylinders 66 and 67. When the rams 59 and 60 move in the positive direction toward each other they being larger than the retracting pistons cause the latter to move inward in the retracting cylinders thus forcing the operating liquid into tank 75 against the pressure of the air cushion therein. When the pressure on the rams is released the compressed air confined in tank 75 forces liquid from said tank back into the retracting cylinders thus causing the retracting pistons to move outward and return the rams to normal position. The retracting cylinders are therefore valveless and require no valve-operating gear.

In the preferred design here shown the parts are so proportioned that the rams are prevented from actually leaving their cylinders by the contact of the inner ends of the retracting pistons with the inner ends of their cylinders but special means are provided for regulating the depth of mold, and also the thickness of the finished brick as will be hereinafter described.

The adjustment of the lower ram so that the top of the plungers 64 will come to a point just flush with the top of the mold box is effected through the medium of a pair of nuts 78 and 79, on each of the tension rods 73.

Another advantage in employing a separate auxiliary tank for retracting the upper ram is that it affords means independent of the rest of the system for holding the upper ram and plungers up in raised position without blocking or other extraneous means in case it becomes necessary to repair any other part of the machine.

*The mechanism for regulating depth of mold.*—A beam 80 is held stationary with respect to the machine frame by means of a pair of rods 81 which are bolted to said frame as best shown in Figs. 1 and 2. This beam is threaded to receive the adjusting screw 82 which is arranged vertically and located in position to act as a stop to limit the downward movement of the crosshead 71, and consequently the downward movement of the lower plungers 64. It is evident that by screwing the set screw 82 up or down in beam 80 the depth of mold may be regulated. Convenient means for accomplishing this consist of a sprocket 86 secured to said screw and operated by a chain 84 from a sprocket 85. Sprocket 85 is rigidly secured to a controlling shaft 83 which is supported in suitable stationary bearings 87 and 88 and is operated by a hand wheel 89 located in a position convenient of access by the operator. By rotating hand wheel 89 the depth to which the lower plunger 64 will drop may be increased or decreased with the result that a greater or less quantity of clay will be deposited.

*The pumping mechanism.*—The pumping mechanism is best shown in Figs. 15 to 20 inclusive and Figs. 23 and 26 and includes low and high pressure pumps designated in general in Fig. 16 by 90 and 91 respectively. These pumps are inclosed in a dust proof, metallic box 92 provided with cover 93 hinged at 94 as best shown in Fig. 18. The pumps are operated from a common crank shaft 95 (see Fig. 16) journaled in bearings 96 bolted to the end walls of box 92 and driven through the agency of gears 97 and 98 (Figs. 18 and 19) from a high speed shaft 99, rotatably mounted in stationary bearings 100 and 101 (as best shown in Fig. 3). Said shaft is driven by pulley 102 operated from any suitable source of power.

*The low pressure pump.*—The function of the low pressure pump 90 illustrated in detail in Figs. 15, 16, 19 and 20 is to furnish the necessary volume of operating fluid to the accumulator 76 for operating the rams 59 and 60 and charger piston 42. The design of this pump is non essential but in the form illustrated consists of a double acting cylinder 103, a piston 104 and piston rod 105, the latter being operated from the crank shaft 95 by the crosshead and slide movement 106.

The cylinder 103 is provided with ports 107 and 108 leading to the valve chambers 109 and 110 in which are located the suction valves 111 and 112 and discharge valves 113 and 114. The suction and discharge valves operate alternately as is usual with pumps of this kind. The liquid passing into the valve chamber through a port 115 below the suction valves as best shown in Figs. 16 and 19. The liquid is delivered by the pump into the pipe 116, from which it may flow either to the pipe 117 which leads to the accumulator 76 or it may flow to the high pressure pump 91 hereinafter described.

*The accumulator.*—The accumulator 76, previously mentioned, is a closed tank and contains both air and liquid. The air serves as a cushion to force the operating liquid into the cylinders which operate the rams and charger. Although the accumulator is preferably mounted upon the machine frame, both it and the pumps and also the auxiliary tank 75 may be located at a distance if desired. The function of the accumulator is to accumulate the operating liquid as it comes from the low pressure pump, and at the proper time, deliver the operating liquid to the ram cylinders with a rush, under the action of the confined air in the accumulator. The effect of the accumulator is thus to not only render the operation smoother and the intensity of pressure uniform in the different cylinders but also increases the rapidity with which the parts operate. If in starting the machine or at any time thereafter it should become desirable to increase the quantity of air in the accumulator the low pressure pump 90 may be converted into an air pump by turning the valve 119 to such position (see Figs. 19 and 20) as to close the port 115, thereby shutting off the liquid supply and opening and throwing the pump into communication with the tube 120 whose upper extremity is above the level of liquid in the proper box 92 and therefore will supply air to the pump instead of liquid. The air passes from the tube through the valve member 121 which is held upon its seat 122 by a helical compression spring 123. Said tube is mounted in stationary bearings 124 in such manner as to be rotatable about its vertical axis and is provided with a handle 125 at the top for rotating it and the valve 121.

*The low pressure pump relief mechanism.*—The pressure in the accumulator is prevented from passing beyond the desired intensity by certain relief mechanism best shown in the lower right corner of Fig. 16. This comprises a small piston 126 arranged to be acted upon by the pressure in the low pressure pump 90. It is normally held in place by a compression spring 127. Said piston is connected to a lever 128 the lower end of which is adapted to operate a sliding stop 129 adapted to slip under the stems of the suction valves 111 and 112 and thus prevent them from seating. It will be remembered that during the normal action of the pump these valves pulsate up and down, thus affording opportunity for the sliding stop to slip beneath them. When the sliding stop is beneath said valves they are prevented from closing and as a result, the operating liquid rushes back and forth in the pump instead of straight on through it. The pump thus becomes ineffective and will remain so until the pressure in the accumulator and the low pressure pump fall below the intensity at which spring 127 is set, after which said spring will cause the return of slide 129 to non active position and permit the pump to resume its normal working. In the preferred construction lever 128 acts against a block 129ª yieldingly mounted in sliding stop 129. This prevents undesirable strain in the parts in case the lever 128 should operate at a time when the valves 111 and 112 are down in the path of the stop. With the construction shown, if the valves are down when the lever operates, the block 129ª will yield until said valves have risen, whereupon said block will immediately force the sliding stop into position underneath the valves.

*The high pressure pump.*—The high pressure pump designated in general by 91 and best illustrated in Figs. 15, 16, 17 and 18 is located intermediate the accumulator and the main cylinders containing the pressing rams, its function being to supplement the low pressure pump and intensify the pressure during the critical period of operation of the machine. Said high pressure pump consists of a body 131 containing three cylinders 132, 133 and 134, in which the plungers 135 and 136 and 137 operate, guided by bushings 138. The number of cylinders is non essential and may be increased or decreased according to the judgment of the designer. The greater the number of cylinders and plungers the more rapid will be the intensification or boosting of the pressure which acts upon the upper and lower rams. An increase in the number of pump cylinders would decrease the period required to produce the desired intensity and vice versa.

Each cylinder of the high pressure pump is provided with an induction valve 140 and an exhaust valve 141 connected by a passage 142 as best shown in Figs. 18 and 23. A chamber 143, common to all of the cylinders lies beneath the induction valves and communicates with a passage 144 through which the operating fluid passes from the accumulator and low pressure pump. A chamber 145, also common to all of the high pressure pump cylinders forms the outlet from the pump and communicates through the passage 146 and pipe 147 with the supply chamber 148 in the valve box or casing 52, as clearly illustrated in Figs. 5, 7, 17 and 18 and in the diagram Fig. 26.

*The valve box or casing.*—As previously mentioned, valve casing 52 contains all the main controlling valves of the machine, that is, the valves which control the rams and the charger; and the operating liquid is supplied to them from the said supply chamber 148. The said main controlling valves are: the induction valve 151 of the upper main cylinder, the exhaust valve 152 of said upper main cylinder, the induction valve 170 of the lower main cylinder, the exhaust valve 171 of said lower main cylinder, the induction valves 53 and 54 of the different ends of the charger-operating cylinder, and the exhaust valves 55 and 56 of the different ends of said charger-operating cylinder. Valves 151 and 152 are operated by rock shaft 157; valves 170 and 171 are operated by rock shaft 173; and valves 53, 54, 55 and 56 are operated by rock shaft 189, which shafts are shown in Figs. 5, 6, 7 and elsewhere and will be herein again referred to.

A safety valve 149 of ordinary construction is located in pipe 147 as best indicated in Figs. 17 and 18 and insures against excessive pressure in the machine.

*The mechanism for controlling the upper ram.*—The downward movement of the upper ram is accomplished by the following mechanism: The valve chamber 150 containing the induction valve 151 and exhaust valve 152 (see Figs. 5, 6, 7 and 10) is connected to the upper main cylinder 10 by a pipe 153 through which the operating liquid passes at accumulator pressure upon the opening of the induction valve 151. This valve is opened by the movement of the charger 32, the acting mechanism being a cam 154 fixed on the side of said charger as best shown in Figs. 4 and 10. Said cam operates a lever 155 pivoted on a bracket 156 bolted to the mold table 31, and is so placed as to operate the lever to open the valve as the charger is about to finish its rearward movement. The valve-controlling rock shaft 157 previously mentioned, is rotatably mounted in lugs 158 cast on the bottom of the valve casing 52 and has rigidly fastened thereon two arms 158ª and 159. Arm 158ª is adapted to engage the stem of the induction valve 151 to open said valve. Arm 159 is adapted to operate the frame 160 (see Figs 4 and 6) which engages the top of the stem of the exhaust valve 152. When said frame is lowered it depresses said exhaust valve against the force of its spring and thereby opens it. The arrangement is such that when rock shaft 157 is rotated in one direction it opens induction valve 151 and closes exhaust valve 152 thereby causing the upper ram 59 to descend; and when said shaft is rotated in the return direction said ram is permitted to ascend under the influence of its retraction piston 68. Rock shaft 157 is operated in one direction (to open valve 151) by an arm 161 which is rigidly secured to said shaft and is pivotally attached at its outer end to a claw 162 as best shown in Fig. 10. This claw engages a pin 163 at the outer end of the above mentioned lever 155. Induction valve 151 is normally held closed and exhaust valve 152 open by means of a tension spring 165 which is attached at one end to an arm 164 rigidly fastened to said rock shaft and at the other end to an eye bolt 167. Said eye bolt screws into a tension-adjusting hand wheel 168 which bears upon a lug 166 extending from the mold table 31. The parts are so related and proportioned that when the charger is about to come to rest on its rearward movement cam 154 acts upon lever 155 and opens the induction valve 151 leading to the upper ram. The exhaust valve 152 is simultaneously closed, and thus the upper ram is caused to start its descent after the charger is in retracted position.

The disengaging of claw 162 from pin 163 occurs at the beginning of the upward movement of the upper ram and is accomplished through the agency of an arm 302 bolted to the upper crosshead which moves in unison with said upper ram. Said arm which is best shown in Figs. 4, 10 and 11, carries a pawl 303 which is spring influenced to assume the position shown at the right of Fig. 10 in which it will, on its upward movement, engage the pin 304 at the outer end of claw 162 and lift said claw free from the pin 163 thereby permitting spring 165 to close induction valve 151 to thereby cause the ascent of the upper ram. The disengaging of claw 162 occurs just before the upper plungers 63 leave the mold, and as the exhaust valve is thereupon opened, the upper ram will rise rapidly under the influence of the upper retracting piston 68.

In order that the pawl 303 may slip by the pin 304 on its downward movement it is provided with a cam 305 which will cause said pawl to swing aside during descent but immediately swing back into line with pin 304 as soon as it has passed the latter.

The reëngagement of pin 163 with claw 162 is caused by a tension spring 306, shown in Fig. 10 one end of said spring being connected to the mold table 31 and the other end to lever 155. The tendency of this spring is to hold the upper end of lever 155 close to the side of the charger 32. After the charger has moved forward from normal rest position at the rear and the operating cam 154 has released lever 155, spring 306 will swing said lever so that the lower end thereof will move outward toward the end of claw 162 to reëngage the latter.

*The mechanism for controlling the lower ram.*—The valve chamber 169, located in the valve casing 52 and containing the induction valve 170 and exhaust valve 171, is connected to the lower cylinder 11 by a pipe 172 through which the operating fluid passes to and from said lower cylinder. As previously stated, valves 170 and 171 are controlled by the rock shaft 173 shown in Figs. 6 and 7. The gearing by which said shaft is operated is shown in detail in Figs. 8 and 9, and the location of this gearing with respect to the rest of the machine is indicated in Figs. 3 and 4. Said rock shaft 173 is journaled in lugs 174 on the bottom of the valve casing 52 and has an arm 175 rigidly fastened to it in position to engage the stem of the induction valve 170 as shown in Fig. 7. Said shaft also has an arm 176 rigidly fastened to it adapted to engage and depress a frame 177 which, as shown in Fig. 6, engages the projecting upper extremity of the stem of exhaust valve 171. The connections are such that when rock shaft 173 is rotated in one direction it will open induction valve 170 and simultaneously close exhaust valve 171 and when rotated in the opposite direction will close said valve 170 and open valve 171.

Shaft 173 is operated by means of an arm or lever 178, which carries at its outer end a pin 178$^a$. Upon this pin as a fulcrum is mounted a hub 179$^a$, best shown in Fig. 9. To this hub are rigidly fastened two members, one a claw 179 and the other an arm 184. During a certain period of the cycle of operation, arm 178 is held in position to hold induction valve 170 open by the engagement of claw 179 with a stationary stop lug 180 formed upon the mold table 31 or some other part of the machine frame. Said arm tends to return to the position in which said induction valve will be closed under the influence of a spring 183 attached at one end to the outer end of arm 184 and at the other end to a threaded eye bolt 185. Said eye bolt screws into a hand wheel 186 which rests upon a stationary lug 186$^a$ formed at the side of the mold table 31. The function of bolt 185 and wheel 186 is to regulate the tension of spring 183. Spring 183 also, it will be observed, has a tendency to hold the upper end of claw 179 in engagement with stop lug 180 and close to the side of the charger 32.

The means for moving arm 178 against the influence of spring 183 consist of a starting piston 181 working in a stationary cylinder 182 secured to a suitable portion of the machine frame. The stem of said piston is located in position to act upon arm 178 to open valve 170 when said stem and piston move outwardly within their cylinder. This cylinder has a small pipe connection 182$^a$ with the fluid circuit of the upper main cylinder 10 and in consequence when a predetermined pressure in said upper cylinder has been reached, piston 181 will be forced outwardly and will open induction valve 170 leading to the lower main cylinder 11. Thus it will be seen that the lower ram will not start to ascend until the pressure upon the upper ram has reached a predetermined intensity. It may be said therefore that the valves which control the lower ram are themselves pressure-controlled.

When the starting piston 181 has thus opened valve 170, the latter is held open by the engagement of claw 179 with the stop lug 180 and the valve is thus held open and the companion exhaust valve 171 held closed until the claw is positively released. This release is effected by means of a cam 188 located at the side of the charger 32. This lug is so placed that it will not release the claw until after said charger has progressed far enough forward to push the pressed brick off from the lower plungers 64.

Upon relaxation of pressure from the circuit of the upper main cylinder, the piston 181 is immediately retracted by a spring 187 the purpose being to normally hold the stem or piston 181 up where it will not interfere with the rapid operation of arm 178 and the valves controlled thereby. It is evident that the pressure in the upper main cylinder determines when the lower ram shall begin to rise; also that said lower ram will not commence to descend until a moving part of the machine has reached a predetermined position. In other words the clay in the mold will not receive bottom pressure until it has received a predetermined intensity of top pressure; also, the lowering of the lower plungers is independent of pressure but bears a timed relation to a moving part of the machine.

After the charger has delivered the pressed brick and the cam 188 has released the claw 179 the spring 183 will close the induction valve 170 and open the exhaust valve 171, and the lower ram will rapidly descend under the influence of the lower retracting piston 69. This lowers the lower plungers in the molds and prepares the molds to receive a fresh charge of clay from the charger.

The starting piston 181 is subject to gradual rise of pressure and there may be said to be three conditions or periods during the cycle of operation of said piston, as follows: When the upper main cylinder is open to exhaust and piston 181 is practically at atmospheric pressure the piston will be in its highest position and the spring 183 will hold rock shaft 173 in such position as to hold the exhaust valve 171 open and the induction valve 170 closed. As the pressure in the upper main cylinder increases the piston 181 will descend until it rotates shaft 173 far enough to permit the closure of the exhaust valve. At this time the induction valve 170 still remains closed. As the pressure upon the piston still further increases the shaft 173 will be rotated still farther until it opens the induction valve 170. Thus in the first condition the exhaust valve is open and the induction valve closed, in the second condition the exhaust and induction valves are both closed and in the third condition the exhaust valve is closed and the induction valve open. The parts are so timed that the second condition exists at the time the upper plungers are entering the mold and during a portion of the descent in the mold. As both the exhaust and induction valves are closed at this time the water is locked in the lower main cylinder with the result that the lower ram will bear the force of the upper plunger and will relieve the rods 73 and the adjusting mechanism associated therewith of all stress.

It is important to notice that in this, the preferred arrangement of ducts for the operating fluid, the fluid may pass from the cylinder of the upper ram to the cylinder of the lower ram without entering either of the pumps or the accumulator 76. We have already indicated that under the conditions of high pressure when the rams are moving upward in unison and the material is moving upward in the mold under maximum pressure, the valve leading to the cylinder of the upper ram remains open. This leaves the passage free for the fluid to pass through pipe 153, valve 151, chamber 148, valve 170, and pipe 172 to the cylinder of the lower ram. Consequently it is true that while the lower ram is overcoming the upper ram and the material is being moved upward under maximum pressure in the mold the fluid from the upper ram can flow only into the cylinder of the lower ram. The advantage in this is that the pump is not called upon to handle as much fluid as it would be if the fluid from the upper ram were dissipated and the fluid for operating the lower ram had to be supplied entirely by the pump. Therefore there is a great saving in the amount of power required to operate the machine, for at this stage the high pressure pump has only to supply to the lower cylinder a quantity equal to the excess of capacity of the lower cylinder over the upper cylinder.

It will be observed that by gradually increasing the tension of spring 183 the opening of the induction valve 170 to the lower main cylinder may be made to occur relatively later and later even to occurring after the upper plungers have pressed the clay to final thickness. In such event all of the positive pressing will be done by the upper plungers, the lower plungers remaining stationary until after the final thickness of brick has been reached. On the other hand, by properly adjusting spring 183 the upper and lower plungers may each exert their proper amount of pressure upon the two sides of the brick.

*Mechanism for controlling the charger.*— As previously stated the valves which control the charger are controlled by means of the rock shaft 189. This shaft and the valves operated thereby are shown in Figs. 5, 6 and 7, and the gearing by which said shaft is operated is shown in detail in Fig. 24. Said rock shaft is journaled in lugs 190 upon the bottom of the valve casing 52 and has rigidly attached to it two double levers 191 and 192. The lever 191 is located in position to engage the stems of the induction valves 53 and 54 as shown in Fig. 7. The lever 192 is located in position to operate the stems of the exhaust valves 55 and 56 shown in Fig. 6. Said exhaust valves are operated through the medium of rods 193 and 194 which are guided in suitable bearings in the valve casing 52. The arrangement is such that when shaft 189 is rocked in one direction it will operate the valves of cylinder 40 to cause the piston therein to advance and when rocked in the opposite direction will operate the valves to cause said piston and the charger connected thereto to retract. Said rock shaft 189 is rocked in one direction (to advance the charger) by the final portion of the upward movement of the upper crosshead. It is rocked in the opposite direction (to retract the charger) by the final portion of the downward movement of the lower crosshead. Referring to Fig. 24 wherein the gearing for accomplishing this is shown, shaft 189 has a lever 195 rigidly secured thereto. Said lever has a lateral extension 196 (see also top of Fig. 5) which is engaged by a pawl 197 pivoted to the foot 198 of the controlling rod 199. Said pawl is spring pressed toward lever 195, the arrangement being such that when pawl 197 moves downward, it will slip under lever 195 in position to engage the latter when said pawl moves upward. Controlling rod 199 is slotted to receive two stationary guides 200 and 201 which permit a slight movement of said rod in a vertical direction. An arm 202 secured to the upper crosshead 61 is provided with an adjusting screw 203 located in position to engage a lug 204 formed on the side of said rod 199. The parts are so timed that said lug will be engaged by the arm as said crosshead is about to finish its upward travel. Thus the charger will start to move forward about the time the upper crosshead and ram are in highest position.

Adjustably secured to one of the tension rods 73, which moves in unison with the lower ram and plungers, is an arm 205 which has a cam 206 adapted to engage pawl 197, and throw it out of engagement with the arm 195 about the time the lower crosshead reaches its lowest position. Said arm 205 is also provided with a nose 207 adapted to engage the top of lever 195 and move the same, and rock shaft 189, to position to cause the retraction of the charger. Thus the charger will start backward about the time the lower crosshead is reaching lowest position and the molds are ready to be filled. Rock shaft 189 remains in this last position until the upper crosshead has again descended and subsequently almost finished its ascent. Thus the charger will be back, out of the way while the plungers are acting upon the clay.

*The bypass.*—As already explained, in the operation of the machine the upper plungers first descend and then when the pressure in the upper main cylinder has reached a predetermined intensity the lower plungers begin to rise, giving a bottom pressure to the clay in the mold. As the lower ram has a greater diameter than the upper ram it will, after it commences to rise, keep on rising and will, after the clay has been compressed to final thickness overcome the upper ram and the friction of the clay in the mold. The brick will thus be raised slowly in the mold under maximum pressure, said brick and the plungers rising in unison. The slow raising of the clay in the mold under maximum pressure is of great advantage in the manufacture of pressed brick, first because it imparts a polish to the sides of the brick and second because it affords time for the air to escape from the interstices of the clay and time for the clay to bond completely and thoroughly. After the brick has been subjected to maximum pressure for a certain period accumulator pressure is sufficient, and in this machine the high pressure pump is, after a sufficient interval rendered ineffective by mechanism best illustrated in Figs. 15, 17, 18 and 23.

Communicating with the passage 146 in the high pressure pump is a valve chamber 208 guarded by a valve 209. Leading from chamber 208 to the inlet chamber 143 of the pump is a pipe 210, which constitutes a bypass. When valve 209 is closed the operating liquid will be forced from chamber 146 up through the pipe 147 thence through valve casing 52 to the cylinders. When valve 209 is open however the water will escape through it and the bypass 210 back to the inlet chamber 143. In other words, the pump will merely force the liquid from the discharge directly back to the receiving end of the pump through the bypass 210. Valve 209 is opened upon the opening of the exhaust valve 152 of the upper main cylinder 10, this operation being accomplished by means of a lever 213 fulcrumed on a bearing 214 as shown in Figs. 17, 19 and 23. Said lever is adapted to act upon the projecting portion of the stem of said valve. Lever 213 is operated by means of a rod 212, the upper extremity whereof is adapted to be contacted by an arm 211 rigidly secured to shaft 157 as best shown in Fig. 18. It will be observed that shaft 157 which operates arm 211 is the same shaft which operates the induction valve 151 and exhaust valve 152 which control the upper ram. The parts are so arranged that valve 209 will open the bypass and relieve the cylinders of maximum pressure at the same time that the upper main cylinder is opened to exhaust; and this occurs at the time the upper plungers are about to leave the mold.

*The means for regulating the thickness of the brick.*—The final thickness to which the clay may be compressed in the mold by the upper and lower plungers is determined by distance pieces 216ª and 217ª interposed between the crossheads 61 and 62 in such manner as to limit the distance to within which they may approach each other. These distance pieces are best shown in Figs. 1 and 2. Of course the thickness of the brick may be regulated by varying the length of said distance pieces.

*The choking valve.*—As the lower ram is larger than the upper one, and as the cylinders of both rams are in communication with a common source (the high pressure pump during the act of compression of the clay) the operating liquid tends to flow to the lower cylinder because the latter offers the less resistance. In other words the lower ram having greater area than the upper one, moves more readily under any given intensity of pressure and consequently affords less resistance to the flow of liquid from the high pressure pump. This would tend to prevent the upper ram from exerting the requisite amount of top pressure, and to nullify this tendency and effect a proper balancing of the forces of the upper and lower rams on the clay in the mold we interpose means between the lower cylinder and the high pressure pump for reducing the intensity of pressure in the lower cylinder. This pressure reducer consists of a choking valve which is best illustrated in Figs. 12 and 13, and comprises a valve casing 215 located at a convenient point in the pipe 172 which leads to the lower main cylinder. In said casing are two valves 216 and 217. Valve 216 is so arranged that the flow of liquid to the lower main cylinder will close it while a flow in the opposite direction will open it. It therefore permits free discharge from the lower cylinder but prevents liquid from passing through it into the lower cylinder. Valve 217 is acted upon by a spring 218 which acts in opposition to the liquid entering the lower cylinder and consequently tends to reduce the intensity of pressure in the lower cylinder. Said spring is acted upon by a piston 220 having a stem 221, extending up through a stuffing box 222. Said stem is threaded to coöperate with a pair of hand wheels 223 and 224, the latter wheel being used to lock the former. Said hand wheels limit the inward or downward movement of piston 220 and therefore limit the degree to which spring 218 may be compressed by the liquid operating upon said piston. The greater the degree to which said spring is compressed, the greater will be the difference in intensity of pressure between the liquid in front of and the liquid beyond said valve. A small pipe connection 225 forms a communication between casing 215 and the upper main cylinder 10 and causes the compression of the spring 218. This causes the valve 217 to produce its choking effect and preserves a proper ratio of the forces of the upper and lower rams. By adjusting the hand wheel 223 and 224 the piston 220 may be permitted to produce as great or small a choking effect as desired.

Upon the release of pressure in the upper main cylinder, the choking effect practically terminates and liquid is free to flow through the valve with practically no difference in potential.

If desired, a differential piston, shown in Fig. 14, may be substituted for the one shown in Figs. 12 and 13. In this form the casing at the point where it receives the piston has two different diameters and the piston itself has two different diameters, the larger one being exposed to the action of the liquid flowing from the upper main cylinder. This gives greater effect to the pressure in the upper cylinder than to the pressure reaching it from the underside and renders the valve more positive in its operation.

Operation: The detailed operation of the machine is as follows: Conditions at commencement of cycle: upper plunger at top; lower plunger at bottom; charger at rear, bypass 209 closed; induction valve 151 to main upper cylinder open and exhaust 152 closed; induction valve 170 to lower main cylinder closed and exhaust 171 open. Choking valve 217 closed. Under these conditions, first the upper plunger starts down. Second, when pressure in upper main cylinder reaches a certain point it operates starting piston 181 (see Fig. 8) and opens valve 170 leading to lower main cylinder. Third, the plungers mutually approach, the relative movements being controlled by the choking valve 217. The motion continues until the distance blocks 216 and 217 are reached and the clay has been compressed to final thickness. Fourth, as the upper plunger is about to leave the mold, it releases claw 162 (shown in Fig. 10) and closes the valve leading to upper main cylinder, simultaneously opening the exhaust and permitting the elasticity of the air in tank 75 to rapidly raise retracting piston 68 and with it the upper ram. Simultaneously the bypass valve 209 is opened, thus rendering the high pressure pump ineffective. Sixth, the lower plunger continues to rise (under accumulator pressure) until it reaches the top of the mold where it remains until the charger, (which about this time starts forward,) has pushed the brick off the lower plungers onto the delivery apron. The forward start of the charger is caused by the arm 202 on the upper crosshead (see Fig. 24) lifting the rod 199 and thereby opening the advancing valve of the charger cylinder. Seventh, as soon as the charger has delivered the finished brick, the cam 188 on said charger acts upon the claw 179 (see Fig. 8) and releases arm 178 which closes the valve leading to the lower main cylinder, and simultaneously opens the exhaust. This permits the elasticity of the air in tank 75 to rapidly lower the lower plungers, thereby not only affording a space for the clay to drop into from the charger but actually creating a downward suction upon the clay. Eighth, as the lower plunger reaches the bottom position, the cam 206, connected to said plunger, strikes the pawl 195, disengaging it from the valve arm 195 (see Fig. 24) and permitting the lug 207 to operate said arm to reverse the valves of the charger cylinder, thus causing the charger to move back to normal rest position. Ninth, the final portion of the backward movement of the charger causes the cam 154 on the charger to contact the arm 155 which again closes the bypass valve 209 and closes the exhaust valve 152 and opens the induction valve 151 to the upper main cylinder, ready for a repetition of the cycle.

We claim—

1. In a hydraulic brick press, a mold, an upper and a lower plunger adapted to press clay between them in said mold, an upper and a lower ram for operating said plungers respectively, the lower ram being the larger, an upper and a lower cylinder wherein said rams fit, means for supplying fluid under pressure to said upper and lower cylinders, an admission valve controlling the flow to said lower cylinder said valve being normally closed, and a piston subject to the pressure in the upper cylinder for opening said valve when the pressure in said upper cylinder reaches a certain intensity, whereby, after said intensity of pressure is reached, fluid will be admitted to both upper and lower cylinders and the clay will be raised in the mold under maximum pressure.

2. In a press the combination of a mold, an upper and lower ram for compressing material therein, the lower ram having a larger effective area than the upper, cylinders wherein said rams work, a duct communicating with both upper and lower cylinders, means for forcing operating fluid into said duct, a valve for preventing passage of operating fluid from said duct to the lower cylinder and means operated by the pressure in the upper cylinder for opening said valve, whereby when a predetermined pressure is reached in the upper cylinder operating fluid will be admitted to the lower cylinder.

3. In a hydraulic press, a mold, two opposing fluid actuated rams adapted to press material between them in said mold, a duct adapted to convey fluid from one ram to the other and to said rams from a common source, one ram having a larger effective area than the other whereby they may be moved simultaneously in the same direction to move the material in the mold under pressure, the portion of said duct leading from one ram to the other being open and adapted to convey fluid from the smaller ram to the other when the rams are moving simultaneously in the same direction, and means for controlling the flow of actuating fluid to and from said rams, said controlling means including means operated by one of said rams for releasing the smaller ram from the pressure of the actuating fluid after the material has been moved some distance in the mold under maximum pressure.

4. In a hydraulic press, the combination with a mold and plungers of two rams, one larger than the other, cylinders wherein said rams work, means for supplying fluid under pressure to said cylinders and controlling mechanism for controlling the movement of the larger ram, said controlling mechanism being susceptible to pressure in the smaller cylinder and adapted to admit fluid to the larger cylinder when the pressure in the smaller cylinder has reached a predetermined intensity.

5. In a hydraulic press, the combination with a mold and plungers of two rams, one larger than the other, cylinders wherein said rams work, means for supplying fluid under pressure to said cylinder and controlling mechanism for controlling the movement of the larger ram, said controlling mechanism being susceptible to pressure in the smaller cylinder and adapted to admit fluid to the larger cylinder when the pressure in the smaller cylinder has reached a predetermined intensity, said controlling mechanism being adjustable whereby it may be set to operate at different pressures.

6. In a hydraulic press the combination with a mold and plungers of a first and a second ram, a first and a second cylinder wherein said rams respectively fit, an induction port leading to the first of said cylinders, means for supplying liquid under pressure to said port, means for gradually increasing the pressure in the second cylinder, and pressure-controlled means influenced by the pressure in said second cylinder for opening said port, whereby the first ram receives hydraulic pressure when the pressure on the second ram has reached a predetermined intensity.

7. In a hydraulic press, the combination with a mold and plungers of a first and second ram cylinder, rams therein, an admission valve controlling the admission of operating fluid to the first cylinder, said valve being normally closed and thereby preventing such admission, and a piston subject to the pressure of the fluid in the second cylinder, said piston being adapted to open said admission valve when the pressure in said second cylinder reaches sufficient intensity.

8. In a hydraulic press, the combination with a mold and plungers of two rams, one being larger than the other, cylinders wherein said rams fit, an admission valve controlling the admission to the larger cylinder, said valve being normally shut, and means for opening said valve, said valve opening means comprising a piston operative upon said valve to open it, and a cylinder wherein said piston fits, said last mentioned cylinder being in communication with the smaller ram-cylinder.

9. In a hydraulic press the combination of a mold, two plungers working therein two opposing rams of different diameters, cylinders in which said rams fit, a source of fluid supply common to both of said cylinders, and means for choking the flow of fluid to the larger ram to thereby reduce the intensity of pressure thereon.

10. In a hydraulic press the combination with a mold and plungers of two opposing rams of different diameters, cylinders in which said rams fit, a source of fluid supply common to both of said cylinders, and a choking valve influenced by pressure from the smaller of said cylinders for reducing the intensity of pressure in the larger one.

11. In a hydraulic press the combination with a mold and plungers of two opposing rams of different diameters, cylinders in which said rams fit, a source of fluid supply common to both of said cylinders, and choking means for reducing the intensity of pressure in the larger cylinder, said choking means comprising a valve in the fluid circuit leading from the source to the larger cylinder, and means influenced by pressure from the smaller cylinder tending to close said valve.

12. In a hydraulic press the combination with a mold and plungers of two opposing rams of different diameters, cylinders in which said rams fit, a source of fluid supply common to both of said cylinders, and choking means for reducing the intensity of pressure in the larger cylinders, and choking means comprising a valve in the fluid circuit leading from the source to the larger cylinder, and a piston yieldingly connected to said valve in position to impede the flow through the valve opening, said piston being influenced by fluid pressure from the smaller cylinder.

13. In a hydraulic press the combination with a mold and plungers of two opposing rams of different diameters, cylinders in which said rams fit, a source of fluid supply common to both of said cylinders, and choking means for reducing the intensity of pressure in the larger cylinder, a piston in fluid-circuit relation with the smaller cylinder, a spring interposed between said piston and valve in position to tend to close the latter to impede the flow past it, and means for limiting the action of said piston on said spring.

14. In a hydraulic press the combination with a mold and plungers of two opposing rams of different diameters, cylinders in which said rams fit, a source of fluid supply common to both of said cylinders, and choking means for reducing the intensity of pressure in the lower cylinder, said choking means comprising a valve in the fluid circuit leading from the source to the larger cylinder, a piston in fluid-circuit relation with the smaller cylinder, a spring interposed between said piston and valve in position to tend to close the latter to impede the flow past it, a stem for limiting the action of said piston on said spring and hand adjustable means for limiting the travel of said stem.

15. In a brick press the combination of a pump, a mold, two fluid actuated rams of different areas for pressing material in said mold, cylinders for said rams both in communication with said pump, and means interposed between said pump and the larger cylinder for reducing the intensity of pressure therein.

16. In a brick press the combination of a pump, a mold, two fluid actuated rams of different diameters for pressing material in said mold, a cylinder for each of said rams communicating with said pump, a valve casing located between said pump and the larger cylinder, a valve in said casing arranged to open when moved in the direction of flow from the pump toward the larger cylinder, and means sensitive to the pressure in the smaller cylinder tending to hold said valve closed.

17. In a brick press the combination of a pump, a mold, two fluid actuated rams of different diameters for pressing material in said mold, a cylinder for each of said rams communicating with said pump, a valve casing located between said pump and the larger cylinder, a valve in said casing arranged to open when moved in the direction of flow from the pump, toward the larger cylinder, a spring tending to close said valve and means sensitive to the pressure in the smaller cylinder for acting upon said spring.

18. In a brick press the combination of a pump, a mold, two fluid actuated rams of different diameters for pressing material in said mold, a cylinder for each of said rams communicating with said pump, a valve casing located between said pump and the larger cylinder, a valve in said casing arranged to open when moved in the direction of flow from the pump toward the larger cylinder, a spring tending to close said valve, a controlling piston acting upon said spring and a controlling cylinder wherein said controlling piston fits, said controlling cylinder being in communication with said smaller ram cylinder, and means for limiting the action of said controlling piston on said spring.

19. A hydraulic press comprising a mold, plungers therefor two fluid actuated rams one of which is larger than the other, means for supplying fluid to said rams under practically the same pressure, and means for automatically preserving the force of said rams at a predetermined ratio.

20. In a hydraulic press, in combination, a mold, plungers, two opposing rams of different diameters, cylinders for said rams, means for applying fluid pressure to the rams and means for impeding the flow of liquid to the larger ram, said impeding means being adapted to be non active when the pressure in the smaller cylinder is below a certain critical intensity.

21. In a brick press the combination of a mold, two rams of different diameters for pressing material in said mold, cylinders wherein said rams fit, a source of fluid supply common to both cylinders, and a choking valve interposed between said source and the larger cylinder and subject to the fluid pressure of the smaller cylinder and adapted to be released by the drop in pressure in said smaller cylinder.

22. In a hydraulic press the combination with a mold and plungers of an upper and a lower ram arranged to oppose each other, cylinders wherein said rams fit, valve mechanism for controlling the flow of liquid to and from the upper cylinder, induction and exhaust valves for said lower cylinder, and automatic means for operating said valves in the lower cylinder, said automatic valve-operating means including means for holding said induction valve closed and said exhaust valve open, and a piston operated by liquid in circuit-relation in the upper cylinder for first closing the exhaust valve of the lower cylinder, and upon further increase of pressure opening the induction valve to said lower cylinder, whereby the lower ram is hydraulically locked prior to the induction of actuating liquid thereto.

23. In a hydraulic brick press the combination of a mold, an upper and a lower ram arranged to oppose each other for pressing material in said mold, cylinders wherein said rams fit, valve mechanism for controlling the flow of actuating liquid to and from the upper cylinder, induction and exhaust valves for said lower cylinder, and automatic means for operating means including a spring 183 for holding said induction valve closed and said exhaust valve open, a piston operated by liquid in circuit-relation with the actuating liquid in the upper cylinder for first closing the exhaust valve of the lower cylinder, for hydraulically locking the lower ram, said piston being adapted upon further increase of pressure to open said induction valve.

24. In a hydraulic brick press the combination of a mold, a reciprocating charger, an upper and a lower ram adapted to compress clay in the mold, cylinders wherein said rams fit, automatic means for controlling the flow of actuating liquid to and from the upper cylinder and other means for controlling the flow of actuating liquid to and from the lower cylinder, the last mentioned controlling means including an induction and an exhaust valve for the lower cylinder, a claw adapted to hold the induction valve open and the exhaust valve closed, a trip on the charger for releasing said claw, a spring operative upon release of said claw to hold the exhaust valve open and the induction valve closed and a piston subject to the pressure of liquid in the upper cylinder and adapted to open first the exhaust valve and upon further increase of pressure in the upper cylinder to open said induction valve.

25. In a press the combination with a mold and plungers of an upper and a lower ram, a source for supplying actuating fluid under pressure to said rams, a pump interposed between said source and the rams for intensifying the pressure thereon and a bypass around said pump for rendering the same ineffective and means for controlling the flow through said bypass, said controlling means being adapted to be operated by one of said rams for opening the passage through said bypass whereby said pump is rendered ineffective when one of said rams has reached a predetermined position.

26. In a brick press the combination of a mold, an upper and a lower ram adapted to press material between them in said mold, a source for supplying actuating fluid under pressure to said rams, the lower ram being larger than the upper one whereby the two rams will rise in unison when the material has been compressed to final thickness, a pump interposed between said source and said rams for intensifying the pressure thereon, a bypass around said pump and means operated by one of said rams for controlling the flow through the bypass, the parts being so timed that the bypass will be opened as said rams are rising in unison.

27. In a brick press the combination of a mold, an upper and a lower ram for pressing material in said mold, a low pressure pump for supplying actuating fluid under pressure to said rams, the lower ram being larger than the upper one for rendering it stronger than the upper one, mechanical means interposed between said ram for transmitting force from the larger ram to the smaller whereby said rams move in unison in the same direction after the material has been compressed to final thickness, a high pressure pump interposed between the low pressure pump and the rams for intensifying the pressure on the latter, a bypass around said pump for rendering the same ineffective when the bypass is opened, and means for controlling the flow through said bypass, said controlling means being adapted to be controlled by one of said rams for opening said bypass when the controlling ram has reached a predetermined position.

28. In a hydraulic press the combination with a mold and plungers of a ram, a cylinder wherein said ram fits, a double acting pump for supplying fluid under pressure to said ram, said pump comprising a valve casing, a plurality of suction and a plurality of discharge valves operating alternately, sliding stops adapted to come into operation with the suction valves successively for preventing the movement thereof to thereby render the pump ineffective and fluid actuated means controlled by the pressure on the delivery side of said pump for operating said stops.

29. In a hydraulic press the combination with a mold and plungers of a ram, a cylinder wherein said ram fits, a double acting pump for supplying fluid under pressure to said ram, said pump comprising a valve casing, a plurality of suction and a plurality of discharge valves operating alternately, sliding stops adapted to come into operation with the suction valves successively for preventing the movement thereof to thereby render the pump ineffective, a piston controlled by the pressure on the delivery side of said pump for operating said stops, and a yieldable connection between said piston and said stops.

30. In a hydraulic brick press the combination of a mold, an upper and a lower plunger adapted to press clay between them in said mold, a reciprocating charger, a larger and a smaller ram for operating said plungers, cylinders wherein said rams fit, an admission valve controlling admission to the larger ram cylinder, said valve being normally closed, a lever for opening said valve, a starting piston adapted to move said lever to position to open said valve, a releasable detent for holding said lever in such position, and a reciprocating charger adapted to fill the mold and release said detent, said starting piston being susceptible to the pressure in said smaller ram-cylinder.

31. In a hydraulic brick press the combination of a stationary frame, a mold therein, upper and lower plungers for pressing clay in said mold, a reciprocating charger, rams for operating said plungers, cylinders wherein said rams fit, a source common to both of said cylinders for supplying actuating fluid under pressure thereto, a high pressure pump in series between said source and said cylinders, valves for controlling the supply of actuating fluid to and from said cylinders, and automatic valve gears for operating said valves, the valve gear for the lower cylinder including a rock shaft, a piston sensitive to the pressure in the upper cylinder for rotating the rock shaft to one position, a releasable detent for holding said rock shaft in the position to which it is brought by said piston, means on the charger for releasing said detent and a spring for returning said rock shaft after said detent has been released.

WALTER H. COTTON.
HARRY J. FLOOD.

Witnesses:
DWIGHT B. CHEEVER,
HOWARD M. COX.